(12) United States Patent
Seo

(10) Patent No.: US 12,412,276 B2
(45) Date of Patent: Sep. 9, 2025

(54) LINE DETECTION METHOD

(71) Applicant: KYUNGPOOK NATIONAL UNIVERSITY INDUSTRY-ACADEMIC COOPERATION FOUNDATION, Daegu (KR)

(72) Inventor: Keonwon Seo, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 349 days.

(21) Appl. No.: 17/619,050

(22) PCT Filed: Jun. 12, 2020

(86) PCT No.: PCT/KR2020/007639
§ 371 (c)(1),
(2) Date: Dec. 14, 2021

(87) PCT Pub. No.: WO2020/251299
PCT Pub. Date: Dec. 17, 2020

(65) Prior Publication Data
US 2022/0383506 A1    Dec. 1, 2022

(30) Foreign Application Priority Data

Jun. 14, 2019    (KR) .................. 10-2019-0070671

(51) Int. Cl.
*G06T 7/13*    (2017.01)
*G06T 5/70*    (2024.01)
*G06T 7/60*    (2017.01)

(52) U.S. Cl.
CPC .................. *G06T 7/13* (2017.01); *G06T 5/70* (2024.01); *G06T 7/60* (2013.01)

(58) Field of Classification Search
CPC .... G06T 7/13; G06T 5/70; G06T 7/60; G06T 2207/10016; H04N 5/14; H04N 5/142
See application file for complete search history.

(56) References Cited

U.S. PATENT DOCUMENTS 6,229,578 B1 *   5/2001   Acharya ................... G06T 5/70
                                                               348/625
7,999,867 B2     8/2011   Noh
                          (Continued)

FOREIGN PATENT DOCUMENTS

JP    2017-224110 A    12/2017
KR   10-2001-0032809 A    4/2001
(Continued)

OTHER PUBLICATIONS

International Search Report issued in corresponding International Application No. PCT/KR2020/007639 dated Aug. 28, 2020, pp. 1-2, English Translation.
(Continued)

*Primary Examiner* — Jianxun Yang
(74) *Attorney, Agent, or Firm* — Carter, DeLuca & Farrell LLP

(57) ABSTRACT

Disclosed is a method for detecting a line in an image or a video. The method includes smoothing the image, selecting an area in which a line is to be detected, determining a center pixel in the selected area, applying a window centered on the center pixel, detecting a sum of gradient angle differences of pixels surrounding the center pixel, classifying the center pixel determined as the line candidate into a ridge or a valley, and eliminating a non-maximum pixel.

13 Claims, 13 Drawing Sheets

(a)

(b)

(56) References Cited

U.S. PATENT DOCUMENTS

| | | |
|---|---|---|
| 8,331,686 B2 | 12/2012 | Lee et al. |
| 8,363,932 B2 | 1/2013 | Lee et al. |
| 9,449,245 B2 | 9/2016 | Wang et al. |
| 10,152,780 B2 | 12/2018 | Hsu et al. |
| 10,380,743 B2 | 8/2019 | Miyazato et al. |
| 2017/0236258 A1* | 8/2017 | Hsu .......................... G06T 7/13 382/260 |

FOREIGN PATENT DOCUMENTS

| | | |
|---|---|---|
| KR | 10-0736356 B1 | 7/2007 |
| KR | 10-0886611 B1 | 3/2009 |
| KR | 10-2011-0042781 A | 4/2011 |
| KR | 10-2015-0108303 A | 9/2015 |
| KR | 10-2017-0051369 A | 5/2017 |

OTHER PUBLICATIONS

International Report on Patentability issued in corresponding International Application No. PCT/KR2020/007639 dated Dec. 14, 2021, pp. 1-6, English Translation.

* cited by examiner

FIG. 12
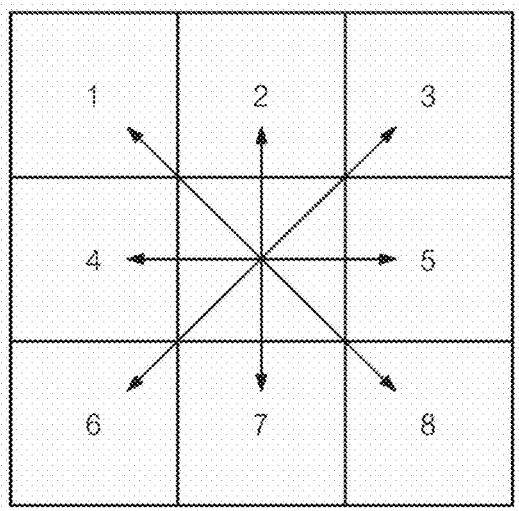
(a)
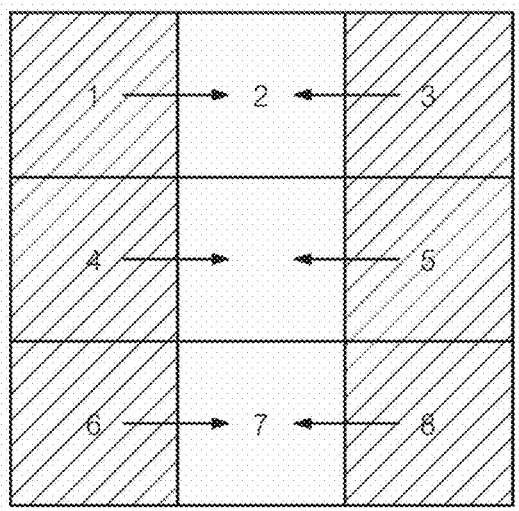
(b)
FIG. 13

(a)　　　　　　　　　　(b)

(a)　　　　　　　　　　(b)

(a)  (b)

(a)  (b)

(a)

(b)

(c)

(d)

LINE DETECTION METHOD

TECHNICAL FIELD

The present invention relates to a method of detecting a line in an image or video. More specifically, the invention relates to a method of detecting a line using the sum of gradient angle differences.

BACKGROUND ART

In the image processing field, an edge represents the boundary of an object whose general brightness value changes rapidly. The conventional method for detecting a line in a video or image uses an indirect line detection method using edge detection and a line detection method based on a second derivative.

However, in the case of the line detection method based on the second derivative, there is a problem in that the line is cut or the location thereof is not accurately detected in line detection when the width of the line is wider than a specific width.

SUMMARY

Technical Problem

The present invention has been proposed to solve the problems of the prior art as described above, and provides a method capable of accurately detecting a line even when the line is thicker.

The present invention detects a line using the sum of gradient angle differences for neighborhood pixels around a center pixel.

The problems to be solved by the present invention are not limited to the problems mentioned above. Other technical problems not mentioned will be clearly understood by those of ordinary skill in the art to which the present invention pertains from the following description.

Technical Solution

The present invention provides a method for detecting a line in an image or a video.

The method comprises smoothing an image; selecting an area in which a line is to be detected, determining a center pixel in the selected area, applying a window centered on the center pixel, and detecting a sum of gradient angle differences for pixels surrounding the center pixel.

The method may include detecting a sum of gradient angle differences for pixels facing each other with respect to the center pixel.

The method may include determining a portion included in the area as a line when the detected sum is greater than or equal to a specific value.

The specific value may be $\pi$ to $3\pi$.

The window may be a 3×3 window.

The determining of the portion included in the area as a line when the detected sum is greater than or equal to a specific value may further include selecting pixels for which the detected sum is equal to or greater than the specific value as line candidates, determining whether a value in each center pixel is a ridge or a valley, and selecting a line from the line candidates.

The selecting of a line from the line candidates may include comparing the sum of the gradient angle differences for the neighborhood pixels with the sum of the gradient angle differences for the center pixel.

The method may include selecting the center pixel as a line when the sum of the gradient angle differences for the center pixel is greater than the sum of the gradient angle differences for the neighborhood pixels.

The present invention provides a computer-readable storage medium for storing a program for executing the line detection method.

Advantageous Effects of the Invention

The present invention can detect a line using the sum of gradient angle differences for neighborhood pixels around a center pixel.

In the present invention, the line can be accurately detected even when the line is thicker.

Further, in the present invention, the signal-to-noise ratio is higher than that of the conventional line detection method, which is effective in terms of image processing.

The effects of the present invention are not limited to the effects described above. Effects not mentioned will be clearly understood by those of ordinary skill in the art to which the present invention belongs from the present specification and the accompanying drawings.

DESCRIPTION OF THE DRAWINGS

FIGS. 12(a) to 12(b) schematically illustrates calculation of the sum of gradient angle differences in the line detection method according to the present invention.

FIGS. 13(a) to 13(b) show a window for calculating a gradient angle.

DETAILED DESCRIPTION

Figure 1:
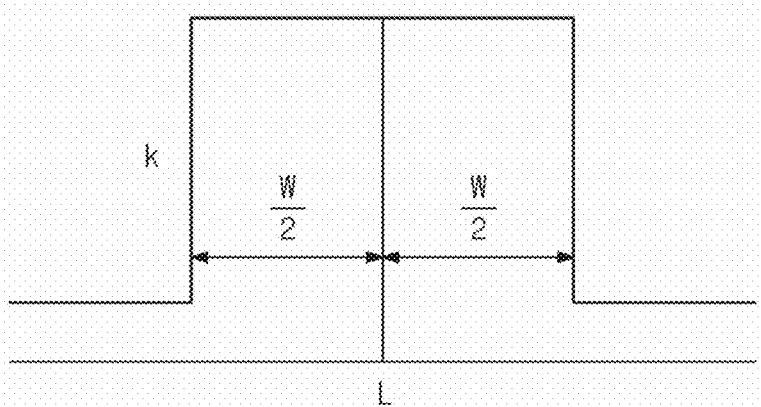
FIG. 1 is an example of a line detection model according to the present invention.

Hereinafter, embodiments of the present invention will be described in detail with reference to the accompanying drawings such that those of ordinary skill in the art to which the present invention pertains can easily implement them. However, the present invention may be embodied in many different forms and should not be construed as limited to the embodiments set forth herein. In addition, in describing a preferred embodiment of the present invention in detail, if it is determined that a detailed description of a related well-known function or configuration may unnecessarily obscure the gist of the present invention, the detailed description thereof will be omitted. In addition, the same reference numerals are used throughout the drawings for parts having similar functions and functions.

In the present invention, in order to detect a line, a window is set on one pixel, and when the sum of the gradient angle differences for neighborhood pixels around the center pixel of the corresponding window is greater than or equal to a specific value, it is possible to make determination as a line. Hereinafter, a conventional method of detecting a line by using edge detection and a method of detecting a line by using a second derivative will be briefly described, and performance judgment is performed on each method. Thereafter, a line detection method according to the present invention will be described, and it will be explained that the line detection method according to the present invention is more effective than the existing method by performing verification.

When line features are extracted from an image, there is need to determine whether to detect edges or whether to detect a line. For making a proper decision, it is necessary to know their performance that is measured for various conditions which are composed of a line width, a noise level, a smoothing factor for noise suppression. Hereinafter, methods for edge detection and line detection under various conditions are reviewed, and then the performance of the methods is compared through detection of SNR.

An image (I) may contain blurring and noise due to the limitations of a camera's lens. The Image "I" may be modeled by a signal convolved by a certain amount of blur "b" and added with "n".

This is expressed as follows:

$$I = F*b+n$$

According to FIG. 1 of the present invention, a line profile in the present invention may be modeled by two factors: the width "w" of the line and the constant "k". The one-dimensional line signal according to FIG. 1 can be expressed mathematically as follows.

$$F(x) = \begin{cases} h+k, & \text{if } \left|x - \frac{L}{2}\right| < \frac{w}{2} \\ h, & \text{otherwise} \end{cases}$$

where "L" is the coordinates of the center point of a line model.

Figure 2:
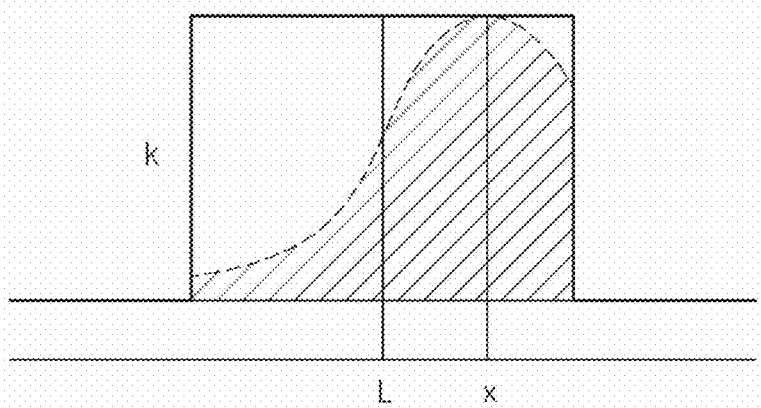
FIG. 2 exemplary shows a result of blurring on the line detection model of FIG. 1.

Meanwhile, in an actual image, edges are variously blurred. In this case, most of the image blurring is caused by the movement or focus of the camera, and even in a stabilized camera, a certain amount of blurring occurs due to the resolution of the camera lens. The blurring effect in the line model is mathematically expressed as follows, and FIG. 2 shows it.

$$b(t) = \frac{1}{\sqrt{2\pi}\,\sigma_b} e^{-\frac{t^2}{2\sigma_b^2}}$$

where $\sigma_b$ is the blurring factor. When the blurring effect is applied to an arbitrary location "x" on a line, the following equation may be expressed.

$$F_b(x) = (F*b)(x) = \int_{x-\frac{w}{2}-L}^{x+\frac{w}{2}-L} \frac{k}{\sigma_b\sqrt{2\pi}} e^{-\frac{t^2}{2\sigma_b^2}} dt$$

It is essential to remove noise after blurring is applied to the image as described above. Smoothing is performed to remove noise. In general, image smoothing may be performed by a kernel defined by a two-dimensional Gaussian function. The smoothing function is as follows.

$$s(u, v) = \frac{1}{2\pi\sigma_s^2} e^{-\frac{u^2+v^2}{2\sigma_s^2}}$$

Where $\sigma_s$ is a smoothing factor. Therefore, the corresponding one-dimensional smoothing function is as follows.

$$s(u) = \frac{1}{\sqrt{2\pi}\,\sigma_s} e^{-\frac{u^2}{2\sigma_s^2}}$$

By applying the convolution of the smoothing function "s" to the original image, a smoothed image is generated. When it is expressed as a formula, it is as follows.

$$I_s = I*s = (F*b+n)*s = F*b*s+n*s$$

After the convolutions of blurring and smoothing, the original line signal (FIG. 1) is transformed as follows.

$$F_{b*s}(x) = (F*b*s)(x) = (F_b*s)(x) = \left( \int_{x-\frac{w}{2}-L}^{x+\frac{w}{2}-L} \frac{k}{\sqrt{2\pi(\sigma_b^2 + \sigma_s^2)}} e^{-\frac{t^2}{2(\sigma_b^2+\sigma_s^2)}} dt \right)$$

Thus, the first derivative of the smoothed line is derived as follows.

$$F'_{b*s}(x) = \frac{dF_{b*s}}{dx} = \frac{k}{\sqrt{2\pi(\sigma_b^2 + \sigma_s^2)}} \left[ e^{-\frac{(x+\frac{w}{2}-L)^2}{2(\sigma_b^2+\sigma_s^2)}} - e^{-\frac{(x-\frac{w}{2}-L)^2}{2(\sigma_b^2+\sigma_s^2)}} \right]$$

In addition, the second derivative of the smoothed line is derived as follows.

$$F''_{b*s}(x) = \frac{d^2 F_{b*s}}{dx^2} =$$

$$-\frac{k}{\sqrt{2\pi}(\sigma_b^2+\sigma_s^2)^{\frac{3}{2}}}\left[e^{-\frac{(x+\frac{w}{2}-L)^2}{2(\sigma_b^2+\sigma_s^2)}}\left(x+\frac{w}{2}-L\right) - e^{-\frac{(x-\frac{w}{2}-L)^2}{2(\sigma_b^2+\sigma_s^2)}}\left(x-\frac{w}{2}-L\right)\right]$$

Hereinafter, a method of measuring the strengths of an edge signal and a line signal through the above obtained equations will be described.

The strength of the edge signal may be measured at the boundary of the smoothing line model derived from the first and second derivative values. The first derivative function indicates the gradient of a smoothed edge profile, and may be obtained by replacing $x=L-w/2$ in the first derivative of the smoothed line as follow:

$$F'_{b*s}|_{x=L-\frac{w}{2}} = \frac{k}{\sqrt{2\pi(\sigma_b^2+\sigma_s^2)}}\left[1-e^{-\frac{w^2}{2(\sigma_b^2+\sigma_s^2)}}\right]$$

In order for edge pixels to be detected distinctively in the local area in the image, the absolute value of the gradient of its neighborhood pixel needs to be low enough as compared to that at the edge location, and the absolute value of the second derivative at the neighborhood pixel needs to be high.

Accordingly, a neighborhood pixel that is one pixel apart from the edge location may be selected, and the second derivative at the pixel location, $x=L-w/2-1$ as another measure of edge strength is derived from the second derivative of smoothed line as follow:

$$F''_{b*s}|_{x=L-\frac{w}{2}-1} = -\frac{k}{\sqrt{2\pi}(\sigma_b^2+\sigma_s^2)^{\frac{3}{2}}}\left[e^{-\frac{1}{2(\sigma_b^2+\sigma_s^2)}} - e^{-\frac{(1+w)^2}{2(\sigma_b^2+\sigma_s^2)}}(1+w)\right]$$

On the other hand, in relation to the strength of the line signal, for a line pixel to be detected distinction, the absolute values of the first derivatives or gradients of the neighborhood pixel of the line pixel must be high.

As one of the neighborhood pixels, a pixel located at $x=L-1$ is chosen and its first derivative as a measure of line strength is derived from the first derivative of the smoothed line as follow:

$$F'_{b*s}|_{x=L-1} = \frac{k}{\sqrt{2\pi(\sigma_b^2+\sigma_s^2)}}\left[e^{-\frac{(1-\frac{w}{2})^2}{2(\sigma_b^2+\sigma_s^2)}} - e^{-\frac{(1+\frac{w}{2})^2}{2(\sigma_b^2+\sigma_s^2)}}\right]$$

Also, for detecting a line pixel, its second derivative value at the line location, $tx=L$ must be high and is derived from the second derivative of the smoothed line as follows:

$$F''_{b*s}|_{x=L} = -\frac{kw}{\sqrt{2\pi}(\sigma_b^2+\sigma_s^2)^{\frac{3}{2}}}\left[e^{-\frac{w^2}{8(\sigma_b^2+\sigma_s^2)}}\right]$$

Using the values obtained as described above, noise in the smoothed image is calculated below. In order to measure SNR values for edge detection and line detection in a smoothed image, it is need to quality the amount of noise after smoothing as well as the quantification of the signal strength. Thus in the following, the noise remaining after smoothing is first quantified and further the correlation between the pixels in the image of smoothed noises is also derived based on an error propagation scheme.

Hereinafter, the noise amount at an arbitrary location, (r,c) is denoted by "n" as.

$n=n(r,c)$

The noise "n" is assumed to have a symmetric distribution about zero, and thus its expectation E{n} is assumed to satisfy the following equation:

$E\{n\}=0$

Then, the dispersion or variance of the noise at a single pixel is defined as follows:

$\sigma_n^2=D\{n\}=E\{[n-E\{n\}]^2\}=E\{n^2\}$

By extending the expectation and dispersion of the noise to the noises of all the pixels in an image, the vector containing all noises has its expectation and dispersion as follows:

$E\{vec(n)\}=0,$ $D\{vec(n)\}=\sigma_n^2 I_d.$

Where $I_d$ is the identity matrix.

The noise amount remaining after smoothing at an arbitrary location (r,c) is expressed as follows.

$(n*s)(r,c)=\int_{-\infty}^{\infty}\int_{-\infty}^{\infty}n(r-u,c-v)s(u,v)dudv$

The expectation of the vectors of the smoothed noises is derived as follows:

$E\{vec(n*s)\}=vec(E\{n\}*s)=0.$

In addition, the dispersion of the vectors of the smoothed noises is derived as follows:

$$D\{vec(n*s)\} = E\{[vec(n*s) - E\{vec(n*s)\}][vec(n*s) - E\{vec(n*s)\}]^T\}$$

$$= E\{[vec(n*s)][vec(n*s)]^T\}$$

In order to quantify the correlation between the noises remaining after the smoothing, the covariance between them is first derived for two arbitrary pixels at (r,c) and (r−α,c−β) as follows:

$$\sigma_{n*s}|(\alpha,\beta) = \text{cov}\{(n*s)|_{(r,c)}, (n*s)|_{(r-\alpha,c-\beta)}\} =$$

$$E\{(n*s)|_{(r,c)} \cdot (n*s)|_{(r-\alpha,c-\beta)}\} = \sigma_n^2 \int_{-\infty}^{\infty}\int_{-\infty}^{\infty} \frac{1}{2\pi\sigma_s^2} e^{-\frac{\xi^2+\eta^2}{2\sigma_s^2}} \cdot$$

$$\frac{1}{2\pi\sigma_s^2} e^{-\frac{(\xi^2-\alpha)^2+(\eta^2-\beta)^2}{2\sigma_s^2}} d\xi d\eta = \frac{\sigma_n^2}{4\pi^2\sigma_s^4}\int_{-\infty}^{\infty}\int_{-\infty}^{\infty} e^{-\frac{\xi^2+\eta^2+(\xi-\alpha)^2+(\eta-\beta)^2}{2\sigma_s^2}} d\xi d\eta =$$

$$\frac{\sigma_n^2}{4\pi^2\sigma_s^4} \cdot e^{-\frac{\alpha^2+\beta^2}{4\sigma_s^2}} \cdot \frac{1}{2\pi\left(\frac{\sigma_s}{\sqrt{2}}\right)^2} \cdot \pi\sigma_s^2$$

$$\int_{-\infty}^{\infty}\int_{-\infty}^{\infty} e^{-\frac{(\xi-\frac{\alpha}{2})^2+(\eta-\frac{\beta}{2})^2}{2\left(\frac{\sigma_s}{\sqrt{2}}\right)^2}} d\xi d\eta = \frac{\sigma_n^2}{4\pi\sigma_s^2} e^{-\frac{\alpha^2+\beta^2}{4\sigma_s^2}}$$

Assuming that the distance between the two arbitrary locations at (r,c) and (r−α,c−β) is "d", then "d" can be expressed as follows:

$$d = (\alpha^2 + \beta^2)^{\frac{1}{2}}$$

When the value of "d" is substituted for the covariance, the covariance between the two pixels is calculated as follows:

$$\sigma_{n*s}|_d = \frac{\sigma_n^2}{4\pi\sigma_s^2} e^{-\frac{d^2}{4\sigma_s^2}}$$

Then, the dispersion that is the auto-covariance of the remaining noise at (r,c) can be expressed as follows:

$$\sigma_{n*s}^2 = \sigma_{n*s}|_{d=0} = \frac{\sigma_n^2}{4\pi\sigma_s^2}$$

Therefore, the correlation among noises remaining after the convolution with a smoothing function for two arbitrary pixels apart with distance "d" is derived as follows:

$$\rho_d = \frac{\sigma_{n*s}|_d}{\sigma_{n*s}^2} = e^{-\frac{d^2}{4\sigma_s^2}}$$

As described above, in order to detect an edge or a line, calculations of the first and second derivatives are performed typically after smoothing. During the calculations, noise remaining after smoothing changes, which needs to be quantified in order to compute SNR for edge detection and line detection When an image is processed, noise occurs. Such noise appears inevitably. A smoothing operation may be performed to remove such noise. However, even when the smoothing operation is performed, a portion of the noise remains. Also, even when the noise disappears, a correlation is generated between neighborhood pixels. That is, a correlation between noises occurs, which can be calculated through error propagation. The correlation can be as larger as the distance between pixels is shorter, and as smaller as the distance between pixels is longer.

Calculation of the first and second derivatives in an image signal are typically implemented by applying convolution of certain kernels to the image. In the present invention, the kernels having a size of 3×3 are used for implementation. Therefore, for investigation on a change of noise during the calculations of the first and second derivatives, it is necessary to consider the smoothed noises within the 3×3 neighborhood at each pixel as follows:

$$(n*s)_{3\times3} = \begin{bmatrix} (n*s)_1 & (n*s)_2 & (n*s)_3 \\ (n*s)_4 & (n*s)_5 & (n*s)_6 \\ (n*s)_7 & (n*s)_8 & (n*s)_9 \end{bmatrix}$$

where "i" in $(n*s)_i$ is the sequential number assigned to each pixel within a 3×3 kernel.

After rearranging the pixels into a vector ordered by their sequential numbers, their correlations are calculated with considering the distance between pixels, and transformed into a matrix as follows:

$$R_{(n*s)_{3\times3}} = \begin{bmatrix} 1 & \rho_1 & \rho_2 & \rho_1 & \rho_{\sqrt{2}} & \rho_{\sqrt{5}} & \rho_2 & \rho_{\sqrt{5}} & \rho_{2\sqrt{2}} \\ & 1 & \rho_1 & \rho_{\sqrt{2}} & \rho_1 & \rho_{\sqrt{2}} & \rho_{\sqrt{5}} & \rho_2 & \rho_{\sqrt{5}} \\ & & 1 & \rho_{\sqrt{5}} & \rho_{\sqrt{2}} & \rho_1 & \rho_{2\sqrt{2}} & \rho_{\sqrt{5}} & \rho_2 \\ & & & 1 & \rho_1 & \rho_2 & \rho_1 & \rho_{\sqrt{2}} & \rho_{\sqrt{5}} \\ & & & & 1 & \rho_1 & \rho_{\sqrt{2}} & \rho_1 & \rho_{\sqrt{2}} \\ & & & & & 1 & \rho_{\sqrt{5}} & \rho_{\sqrt{2}} & \rho_1 \\ & \text{Sym.} & & & & & 1 & \rho_1 & \rho_2 \\ & & & & & & & 1 & \rho_1 \\ & & & & & & & & 1 \end{bmatrix}$$

$R_{(n*s)_{3\times3}}$ is referred to as a correlation matrix.

In the correlation matrix, assuming that pixels 1 to 9 exist in a 3×3 matrix, their correlation coefficients (1,1), (1,2), (1,3), (1,4), . . . (1, 9) are present in the first row. In the second row, their correlation coefficients (2,1), (2,2), (2,3), . . . (2,9) are present.

That is, the correlation matrix may appear as a symmetric matrix.

To calculate the first derivative in the column direction, a scaled Sobel operator is used in the present invention.

$$D_c = \frac{1}{8}\begin{bmatrix} -1 & 0 & 1 \\ -2 & 0 & 2 \\ -1 & 0 & 1 \end{bmatrix}.$$

The kernel in the first derivative is vectorized and expressed as $V_{D_c} = \text{vec}(D_c^T)$.

Through the above equation, the dispersion of the noise resulting from the convolution of the smoothed noise with the kernel in above equation can be quantitatively derived. The value is as follows.

$$\sigma_{n*s*D_{cc}}^2 = \sigma_{n*s}^2 V_{D_{cc}}^T R_{(n*s)_{3\times3}} V_{D_{cc}} = \frac{\sigma_n^2}{64\pi\sigma_s^2}(3 + 4\rho_1 - 2\rho_2 - 4\rho_{\sqrt{5}} - \rho_{2\sqrt{2}}).$$

Moreover, to calculate the second derivative in the column direction, in the present disclosure, the following kernel is defined and used as follows:

$$D_{cc} = \frac{1}{4}\begin{bmatrix} 1 & -2 & 1 \\ 2 & -4 & 2 \\ 1 & -2 & 1 \end{bmatrix}$$

The kernel in the second derivative is vectorized and expressed as $V_{D_{cc}} = \text{vec}(D_{cc}^T)$.

The dispersion of the noise resulting from the convolution of the smoothed noise with the kernel in the above equation can be quantitatively derived. The value is as follows.

$$\sigma_{n*s*D_c}^2 = \sigma_{n*s}^2 V_{D_c}^T R_{(n*s)_{3\times3}} V_{D_c} = \frac{\sigma_n^2}{16\pi\sigma_s^2}(9 - 16\rho_{\sqrt{2}} + 6\rho_2 + \rho_{2\sqrt{2}})$$

Through the derived values as described above, the SNRs of edge detection and line detection are derived using quantified signal strengths, and can be derived from the amount of noise resulting from smoothing and convolution of specific kernels.

To detect edge pixels at the boundaries of a line, its SNR for the first derivative in the column direction is derived as follows:

$$SNR(edge_{D_c}) = \frac{F'_{b*s}|_{x=L-\frac{w}{2}}}{\sigma_{n*s*D_c}}$$

Similarly, the edge SNR for the second derivative in the column direction can be derived as follows.

$$SNR(edge_{D_{cc}}) = \frac{F''_{b*s}|_{x=L-\frac{w}{2}-1}}{\sigma_{n*s*D_{cc}}}.$$

In the present invention, edge detection is considered to be performed based on the combination of the first and second derivatives, and a value obtained by combining the SNRs of the first and second derivatives is expressed as SNRC (edge) as follows:

$$SNRC(edge) = \sqrt{SNR(edge_{D_c}) \cdot SNR(edge_{D_{cc}})}.$$

As the SNR for edge detection, to detect a line pixel at the center of a line, the SNR for the first derivative in the column direction can be derived as follows:

$$SNR(line_{D_c}) = \frac{F'_{b*s}|_{x=L-1}}{\sigma_{n*s*D_c}}.$$

The SNR of line detection for the second derivative in the column direction can be derived as follows.

$$SNR(line_{D_{cc}}) = \frac{F''_{b*s}|_{x=L}}{\sigma_{n*s*D_{cc}}}.$$

Because the line detection is considered to be performed based on combination of the first and second derivatives in the present invention, a value obtained by combining the SNRs of the first and second derivatives is expressed as SNRC (line) as follows:

$$SNRC(line_{SD}) = \sqrt{SNR(line_{D_c}) \cdot SNR(line_{D_{cc}})}$$

As the size of blurring and smoothing grows, signals tend to be mixed with their neighborhood signals and thus to be degenerated. In the present invention, a penalty function is introduced for accounting for the degeneration of signals with the growth of the blurring and smoothing.

$$p(\sigma_b, \sigma_s) = (\sigma_b^2 + \sigma_s^2)^{-1}$$

The SNR of edge detection with the penalty for blurring and smoothing is expressed as SNRPS (edge).

$$SNRPS(edge) = p(\sigma_b, \sigma_s) \cdot SNR(edge).$$

The SNR of line detection with the penalty for blurring and smoothing is expressed as SNRPS (line).

$$SNRPS(line_{SD}) = p(\sigma_b, \sigma_s) \cdot SNR(line_{SD}).$$

Because the detection of edge pixels is required at the both sides of the line to find the line pixel, the SNRPS of edge detection for the purpose of line detection is calculated by halving SNRPS (edge).

$$SNRPS(edge \text{ for line}) = \frac{SNRPS(edge)}{2}$$

Hereinafter, the performance is determined by comparing the values of the signal-to-noise ratio (SNR) calculated respectively by the line detection methods. For comparison of the performance of the edge detection for line detection and the direct line detection, a set of graphical investigation can be used. For investigation, tests may be performed for varying smoothing factors and the line widths "w". The smoothing factor may be set to vary from 0.4 to 10.0 with an interval of 0.1, and the line width may be set to vary from 0.5 to 20.0 with an interval of 0.1.

Also, the blurring factor may be set to 1.0. Calculation is performed assuming that the standard deviation of noise present in a given image is 0.1 in the graphical investigations.

Figure 3:
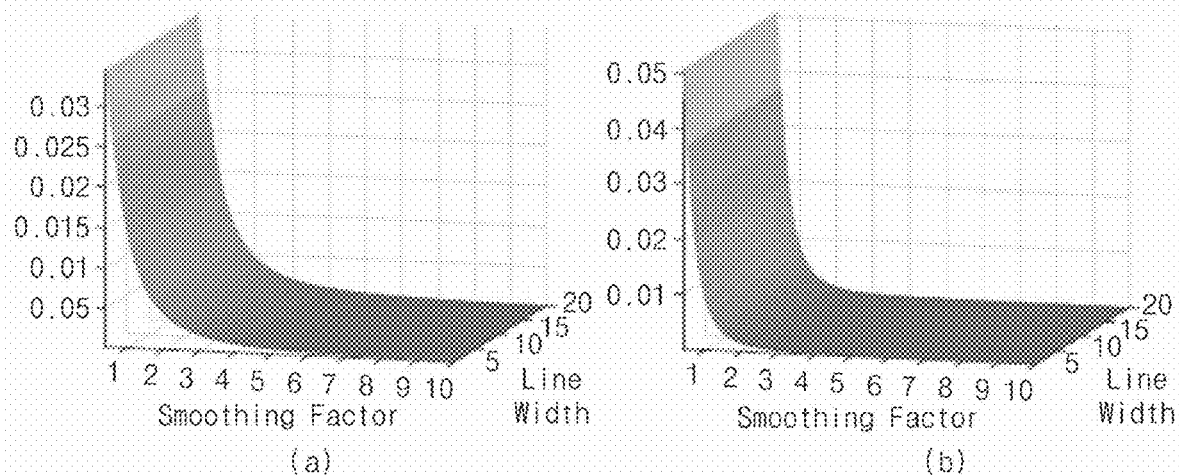
FIGS. 3(a) to 3(b) are graphs showing the standard deviation of noises in a first derivative and a second derivative.

With the setting of the factors as described above, the standard deviation of noise resulting from the first and second derivatives are shown in FIG. 3. As shown in FIG. 3, the standard deviation of noise in both the first and second derivatives become rapidly reduced in the range of smoothing factor less than 1.0 but slowly reduced in the range.

Figure 4:
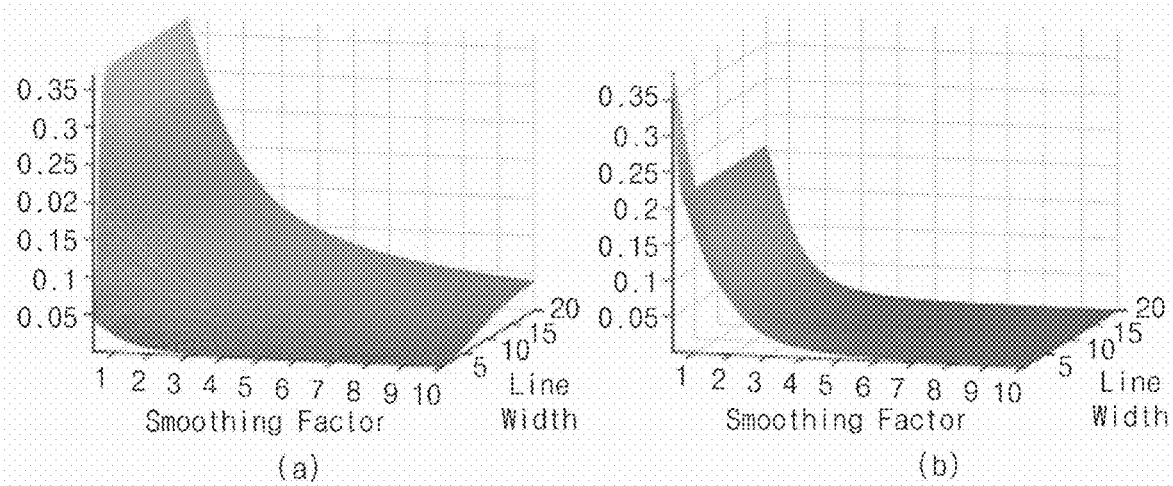
FIGS. 4(a) to 4(b) are graphs showing signal strength of an edge signal in a first derivative and a second derivative.
Figure 5:
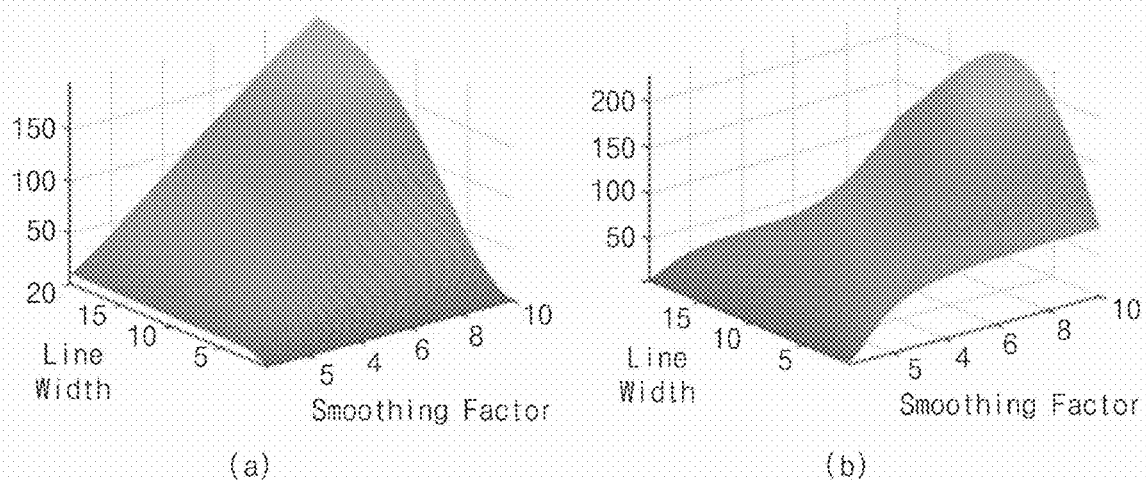
FIGS. 5(a) to 5(b) are graphs showing SNR values of an edge signal in a first derivative and a second derivative.
Figure 6:
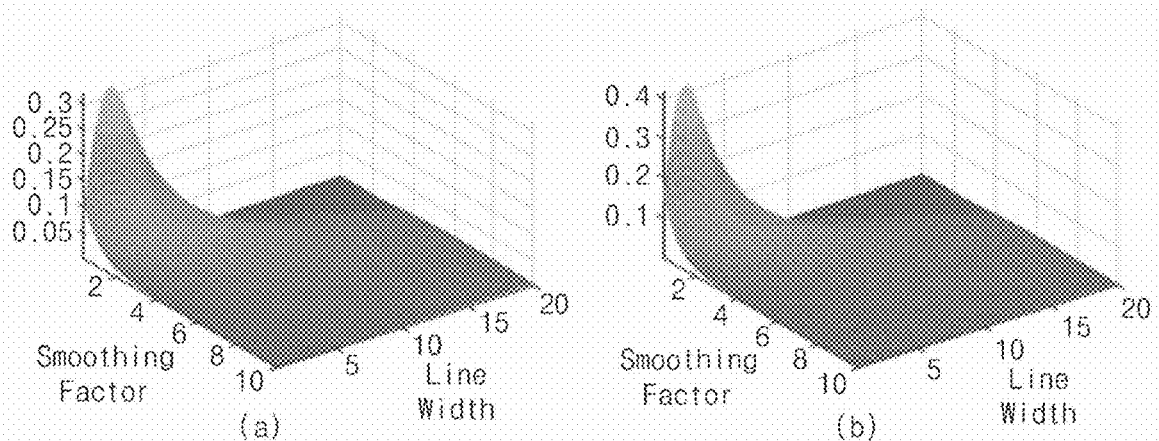
FIGS. 6(a) to 6(b) are illustrating SNRC and SNRPS of an edge detection method.

FIG. 4 shows the strengths of the edge signals of the first derivative and the second derivative. According to FIG. 4, the strength of the edge signal is high when the smoothing factor is small. FIG. 5 shows the SNR of the edge signal in the first and second derivatives. As shown in FIG. 5, the SNR of the edge signal according to the first and second derivatives is high when the smoothing factor is large. FIG. 6(a) shows the SNRC of the edge detection method. When the smoothing factor is set to be large in FIG. 6(a), the signal-to-noise ratio becomes very high, which is distinct particularly when the line width is large. However, the accuracy of the results decreases because the signals become mingled with other signals with increase in the smoothing factor. To improve this, a realistic SNR value is obtained by applying a penalty function to the SNRC (edge). The resulting result is shown in FIG. 6(b). It can be seen that an efficient performance is given compared to FIG. 6(a).

Figure 7:
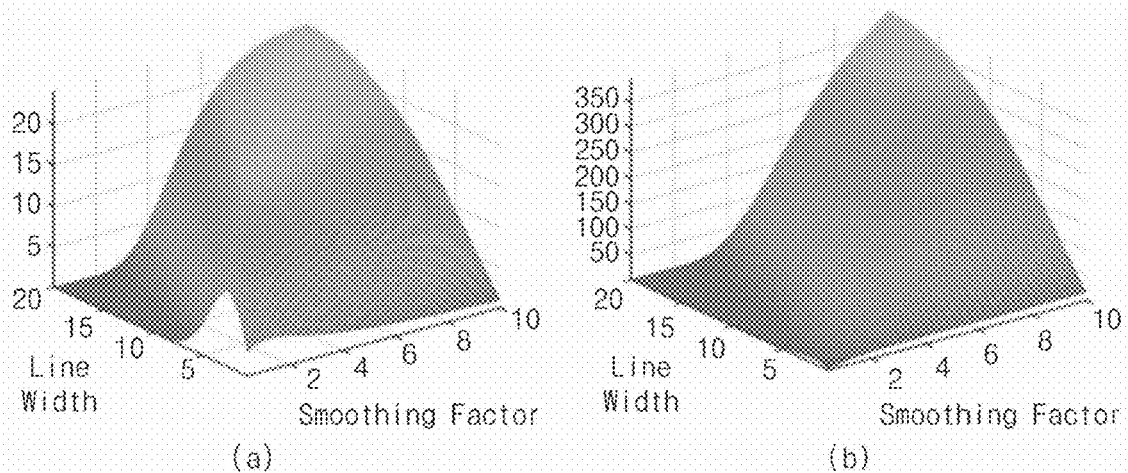
FIGS. 7(a) to 7(b) are graphs showing the intensities of a line signal in a first derivative and a second derivative.
Figure 8:
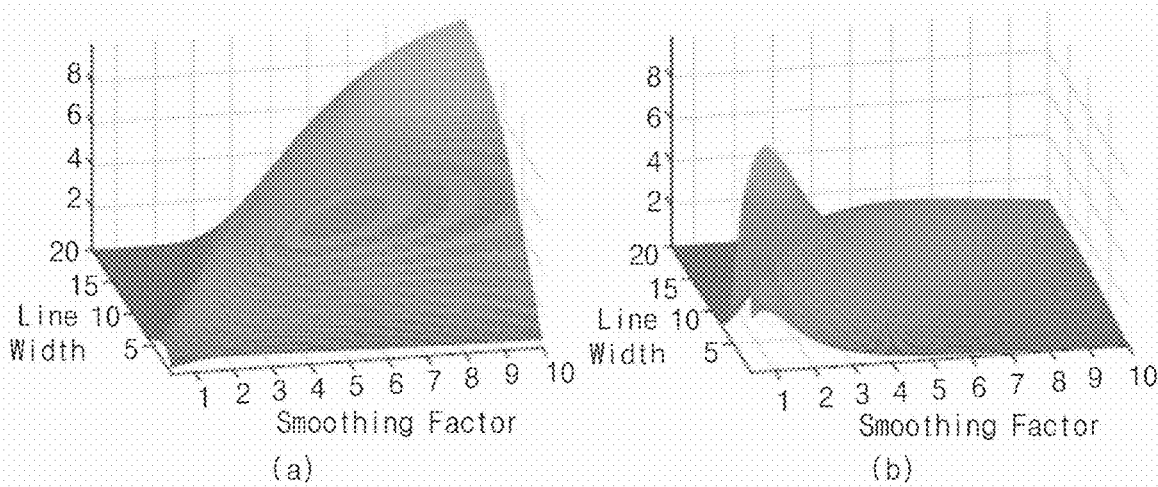
FIGS. 8(a) to 8(b) are graphs showing SNR values of a line signal in a first derivative and a second derivative.
Figure 9:
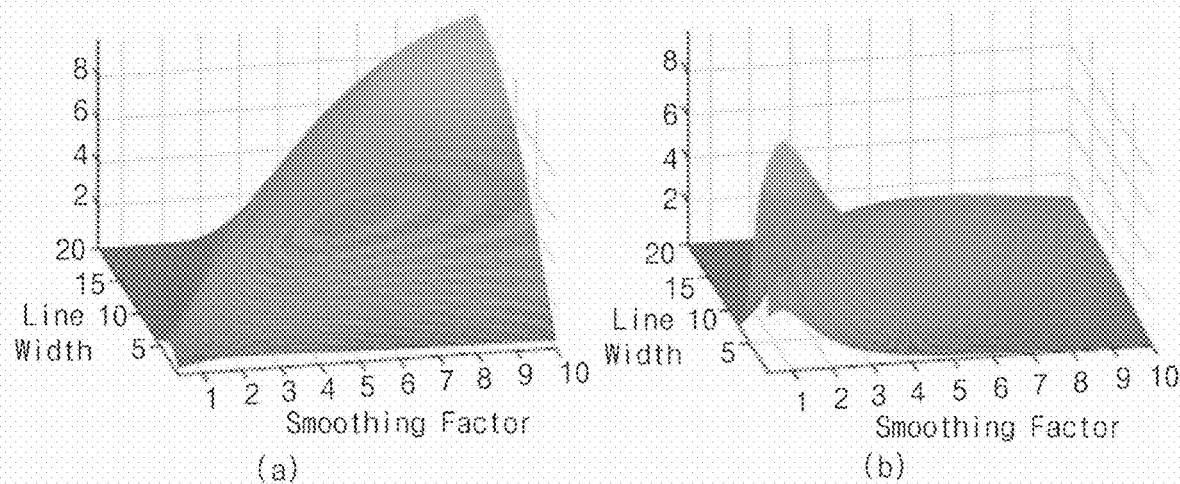
FIGS. 9(a) to 9(b) are illustrating SNRC and SNRPS in a second derivative (SD)-based line detection method.

FIG. 7 shows the strengths of line signals in the first and second derivatives. According to FIG. 7, the strengths of the line signals show almost the same aspect in the first and second derivatives. FIG. 8 illustrates the SNR of line signals in the first and second derivatives. According to this, the SNR of the edge signals according to the first and second derivatives becomes very high when the smoothing factor is set to be large, but the smoothing factor tends to be smaller than that of a method using edge detection. FIG. 9(a) shows the SNRC in the line detection method. As in the case of edge detection, when the smoothing factor increases in FIG. 9(a), the SNR becomes very high. However, interference with other signals occurs as the smoothing factor increases, so that the accuracy of the result decreases. Therefore, a penalty function is applied to SNRC (line) to obtain a realistic measure of SNR, and the final result is shown in FIG. 9(b). It can be seen that an efficient performance is given compared to FIG. 9(a).

Figure 10:
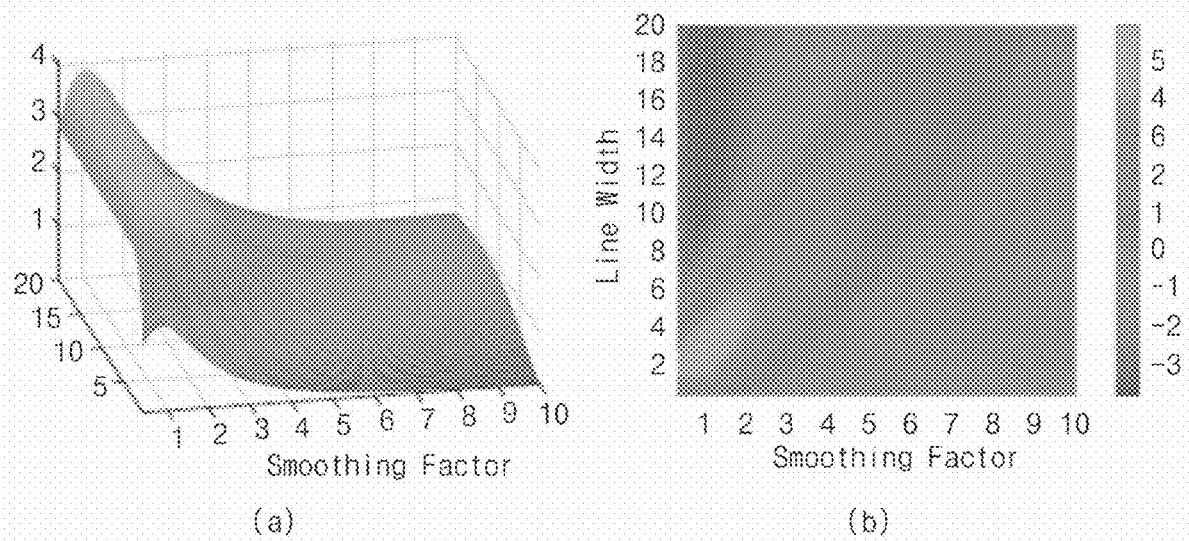
FIGS. 10(a) to 10(b) are graphs comparing SNR according to an edge signal and SNR according to a line signal.

FIG. 10 is a graph comparing SNR according to an edge signal and SNR according to a line signal.

The SNRPS (edge for line) is calculated by the above equation and is shown in FIG. 10(a). FIG. 10(b) shows the difference between SNRPS (line$_{SD}$) and SNRPS (edge for line). Referring to FIG. 10(b), the SD (second derivative)-based direct line detection is shown to be more effective than ED-based line detection in terms of SNR when the line width is relatively small, for example, less than 5 pixels when smoothing factor of 1.0 is applied to and less than 11 pixels when smoothing factor of 3.0 is applied to an image.

In addition, SNRPS (line$_{SD}$)-SNRPS (edge for line) against varying line width are observed when a smoothing factor of 1.0 is applied to an image for a line width ranging within 5 pixels.

The SD-based line detection method is superior to the ED-based indirect line detection method, and it is more efficient for a line with a relatively small width. However, even in SD-based line detection method, a problem occurs when the line width is relatively large. In a test according to FIG. 11, the contrast factor "k" and "L", $\sigma_b$ and $\sigma_s$ are set to 1.0, 0.0, 1.0 and 1.0, respectively, and the line width "w" is set to vary from 2 to 12.

Figure 11:
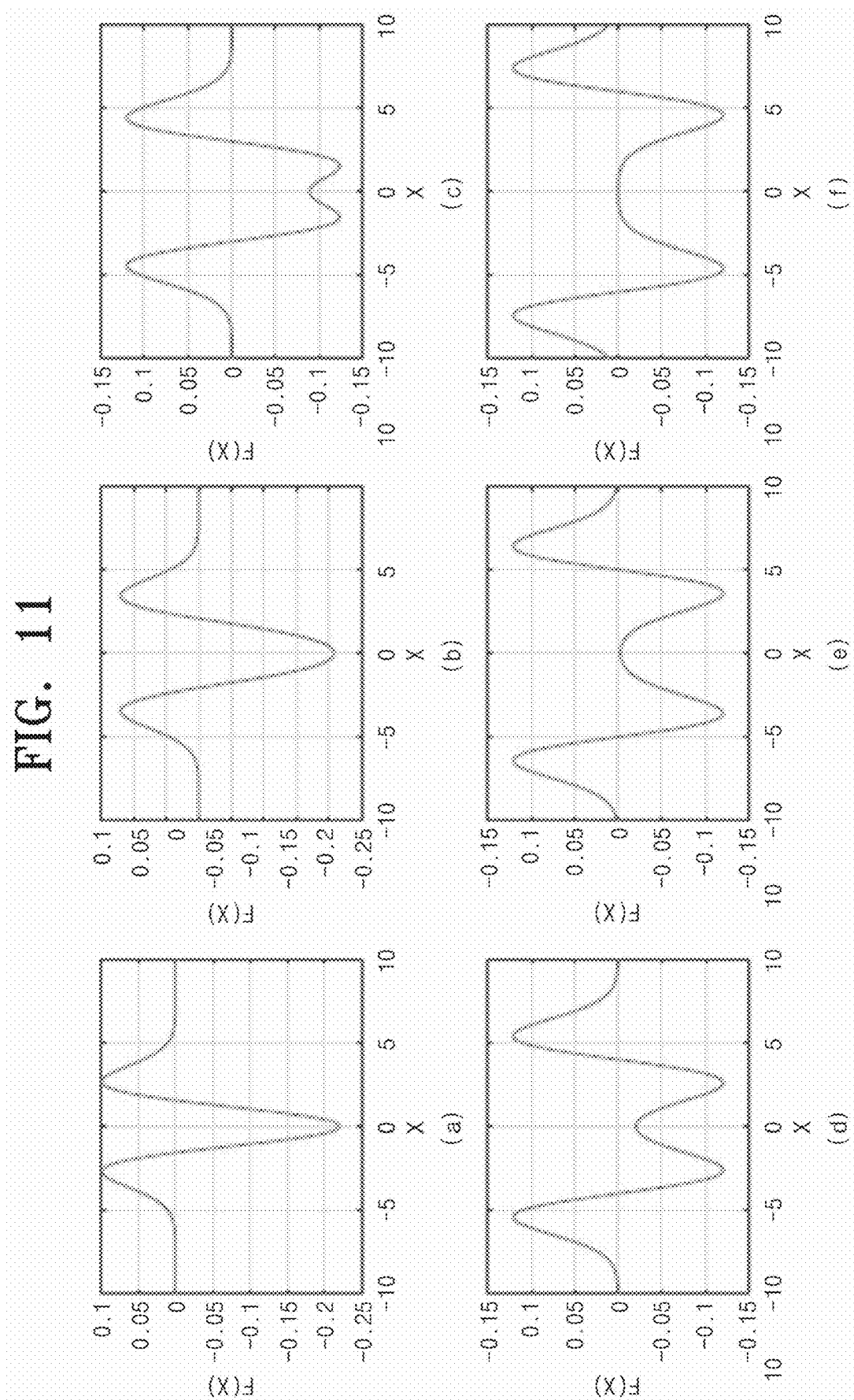
FIGS. 11(a)-11(f) show that graphs are different as a line width varies as a result of a conventional SD-based line detection.

FIG. 11 shows a graph of the results of the second derivative. Tests are performed under conditions that the width of the line is set to 2 in FIG. 11(a), 4 in FIG. 11(b), 6 in FIG. 11(c), 8 in FIG. 11(d), 10 in FIGS. 11(e), and 12 in FIG. 11(f). Referring to FIGS. 11(a) to 11(b), the second derivative function has one extreme value at the center of the line when the line widths are 2 and 4.

However, according to (c) of FIG. 11, two extreme values are generated, and according to (d) to (f) of FIG. 11, as the line width increases, the distance between the extreme values gradually increases, and as the line width increases, the second derivative at the center approaches zero. That is, the SD-based line detection method has a disadvantage in that it is affected by the width of the line to be detected.

Hereinafter, a line detection method different from the conventional method is disclosed.

After a line detection method according to the present invention is defined, the performance thereof is investigated based on its SNR. Also, the performance of the sum of gradient angle differences (SGAD)-based line detection can be compared to that of SD-based line detection.

The line detection method according to the present invention may select an area in which a line is to be detected from an image or a video on which line detection is performed.

A user may select an area in which a line is to be detected, but area selection may be processed for all portions of an image or video by any machine processing. According to an example, area selection for line detection may be sequentially performed from one edge of the target image or video and to the opposite edge. An area in which a line is to be detected may be selected in the form of a square.

When an area in which a line is to be detected is selected, a center pixel in the selected area may be set. Hereinafter, a description is given assuming that an area in which a line is to be detected is a square shape.

The center pixel in the selected area may be a center point of the square. A line to be detected may be located in the center pixel. After setting the center pixel, a virtual window for the selected area may be applied. The virtual window may be provided in the form of 3×3. However, the virtual window may be provided in various forms.

FIGS. 12(a) to 12(b) show that a window for describing the line detection method according to the present invention is used.

FIG. 12 describes a method of determining the sum of gradient angle differences between pixels adjacent to a center pixel in a virtual window.

The virtual window is subjected to sequential-numbering. In the case of a 3×3 window, pixels have numbers from 1 to 8 sequentially except for the center pixel. The method of obtaining gradient angle differences between pixels adjacent to the center pixel is to determine the sum of the gradient angle differences of pixels facing each other with respect to the center pixel.

Referring to FIG. 12(a), pixels facing each other with respect to the center pixel may be determined as pairs of (1,8), (2,7), (3,6), and (4,5). The direction of the gradient is from a dark part to a light part.

An example of calculating gradient angle differences will be described using FIG. 12(b).

Referring to FIG. 12(b), it is assumed that a 3×3 window is applied to an area with a line to be detected, and pixels except pixels at locations 2 and 7 are dark parts.

Since the direction of the gradient is from the dark part to the light part, in each pixel in FIG. 12(b), the gradient directions may be set in the directions of 1->2, 4->5, 6->7, 3->2, 5->4, 8->7. Since the center pixel corresponds to a center point, in the case of finding the sum of the gradient angle differences for neighborhood pixels with respect to the center point, the sum can be expressed with sum of the gradient angle difference between 1 and 8, the gradient angle difference between 4 and 5, the gradient angle difference between 6 and 3, and the gradient angle difference between 2 and 7.

Since the gradient between pixels 2 and 7 is zero, the angle difference is also zero.

However, since pixels 1 and 8, pixels 4 and 5, and pixels 3 and 6 have gradient angles with respect to neighborhood pixels, it is possible to find the sum of the gradient angle differences for all pixels by calculating the magnitude and angle of the gradient direction in each pixel.

When a line does not exist in the area selected for line detection, a center pixel is formed on the virtual window, and the sum of the gradient angle differences facing each other will appear as 0 because there will be no gradient difference between neighborhood pixels with respect to the corresponding center pixel, so that it may be determined that the corresponding area does not have a line.

However, in the case of FIG. 12(b), since there is a shade and the sum of the gradient angle differences has as a value other than 0, the corresponding area may be specified as a candidate pixel in which a line exists.

This will be described through equations including a variable.

The gradient angle for any pixel is defined as $$\theta_i = \tan^{-1}\left(\frac{g_{r_i}}{g_{c_i}}\right)$$

Where "i" is a pixel, $g_{r_i}$ denotes a gradient of the pixel "i" in the row direction, and $g_{c_i}$ denotes a gradient of the pixel "i" in the column direction.

The gradient angle difference of two different pixels can be calculated from the minimum positive angle between their gradient vectors at the two pixels. This is indicated as follows:

$$\delta_{i,j} = \min(abs(\theta_i - \theta_j), 2\pi - abs(\theta_i - \theta_j))$$

As described above, line detection may be performed by calculating the sum of gradient angle differences for pairs of neighborhood pixels surrounding the center pixel. This can be expressed as follows:

$$SGAD = \delta_{1,8} + \delta_{2,7} + \delta_{3,6} + \delta_{4,5}$$

A dispersion value between two pixels can be obtained through the above equation.

The dispersion of the single-angle difference between the i-th pixel and the j-th pixel can be calculated as follows:

$$D\{\theta_i - \theta_j\} = [1 \; -1] D\left\{\begin{bmatrix} \theta_i \\ \theta_j \end{bmatrix}\right\} \begin{bmatrix} 1 \\ -1 \end{bmatrix}$$

The dispersion of the vector of the angles in the above equation is derived as follows:

$$D\left\{\begin{bmatrix}\theta_i \\ \theta_j\end{bmatrix}\right\} = J_{\theta(i,j)} D\left\{\begin{bmatrix}g_{c_i} \\ g_{r_i} \\ g_{c_j} \\ g_{r_j}\end{bmatrix}\right\} J_{\theta(i,j)}^T.$$

In this case, the Jacobian matrix is applied as follows:

$$J_{\theta(i,j)} = \begin{bmatrix} \dfrac{\partial \theta_i}{\partial g_{c_i}} & \dfrac{\partial \theta_i}{\partial g_{r_i}} & 0 & 0 \\ 0 & 0 & \dfrac{\partial \theta_j}{\partial g_{c_j}} & \dfrac{\partial \theta_j}{\partial g_{r_j}} \end{bmatrix},$$

$$\dfrac{\partial \theta}{\partial g_{c_i}} = -\dfrac{g_{r_i}}{g_{c_i}^2 + g_{r_i}^2},$$

$$\dfrac{\partial \theta}{\partial g_{r_i}} = \dfrac{g_{c_i}}{g_{c_i}^2 + g_{r_i}^2}.$$

The dispersion of the vector of gradients using the above equations is derived as follows:

$$D\left\{\begin{bmatrix}g_{c_i} \\ g_{r_i} \\ g_{c_j} \\ g_{r_j}\end{bmatrix}\right\} = J_{g(i,j)} \sigma_{n*s}^2 R_{i,j} J_{g(i,j)}^T.$$

The gradient value in the column direction at the i-th pixel may be calculated by convolution of the smoothed image with the kernel, which is expressed as follows:

$$g_{c_i} = (I * s * D_c)_i = (F * b * s * D_c)_i + (n * s * D_c)_i$$

To calculate the gradient in the row direction, the kernel may be defined as follows:

$$Dr = \dfrac{1}{8}\begin{bmatrix}-1 & -2 & -1 \\ 0 & 0 & 0 \\ 1 & 2 & 1\end{bmatrix}$$

The gradient value in the row direction at the i-th pixel may be calculated by convolution of the smoothed image with the kernel.

$$g_{r_i} = (I * s * D_r)_i = (F * b * s * D_r)_i + (n * s * D_r)_i$$

FIG. 13 shows examples of a window for calculation of a gradient, wherein numbers contained within a pixel represent pixel indexes used to indicate pixel locations in a Jacobian matrix. In FIG. 13(a), the center pixel is located at 8, and the gradient angle difference is calculated for pixels located at pixel 5 and pixel 11. The reason for this is that pixels having a difference in gradient angles with respect to center pixel 8 correspond only to pixel 5 and pixel 11. Similarly, in FIG. 13(b), the center pixel is located at 9, and the gradient angle difference is calculated for pixels located at pixel 5 and pixel 13.

Hereinafter, by calculating the dispersion value of the gradient angle difference using the above equations, the line detection method according to the present invention is proven to be more effective than the conventional SD-based method, and a method of detecting a line from values and candidates that can be a reference value for finally determining a line in the proof process will be described.

The Jacobian matrix is derived when i=4, j=5 as follows:

$$J_{g(4,5)} = \begin{bmatrix} -1 & -2 & -1 & 0 & 0 & 0 & 1 & 2 & 1 & 0 & 0 & 0 & 0 & 0 & 0 \\ -1 & 0 & 1 & -2 & 0 & 2 & -1 & 0 & 1 & 0 & 0 & 0 & 0 & 0 & 0 \\ 0 & 0 & 0 & 0 & 0 & 0 & -1 & -2 & -1 & 0 & 0 & 1 & 2 & 1 \\ 0 & 0 & 0 & 0 & 0 & 0 & -1 & 0 & 1 & -2 & 0 & 2 & -1 & 0 & 1 \end{bmatrix}.$$

The Jacobian matrix is derived when i=1, j=8 as follows:

$$J_{g(1,8)} =$$

$$\begin{bmatrix} -1 & -2 & -1 & 0 & 0 & 0 & 1 & 2 & 1 & 0 & 0 & 0 & 0 & 0 & 0 & 0 \\ -1 & 0 & 1 & -2 & 0 & 2 & -1 & 0 & 1 & 0 & 0 & 0 & 0 & 0 & 0 & 0 \\ 0 & 0 & 0 & 0 & 0 & 0 & 0 & -1 & -2 & -1 & 0 & 0 & 0 & 1 & 2 & 1 \\ 0 & 0 & 0 & 0 & 0 & 0 & 0 & -1 & 0 & 1 & -2 & 0 & 2 & -1 & 0 & 1 \end{bmatrix}$$

The correlation matrix is derived when i=4 and j=5 as follows:

$$R_{4,5} = \begin{bmatrix} 1 & \rho_1 & \rho_2 & \rho_1 & \rho_{\sqrt{2}} & \rho_{\sqrt{5}} & \rho_2 & \rho_{\sqrt{5}} & \rho_{2\sqrt{2}} & \rho_3 & \rho_{\sqrt{10}} & \rho_{\sqrt{13}} & \rho_4 & \rho_{\sqrt{17}} & \rho_{2\sqrt{5}} \\ & 1 & \rho_1 & \rho_{\sqrt{2}} & \rho_1 & \rho_{\sqrt{2}} & \rho_{\sqrt{5}} & \rho_2 & \rho_{\sqrt{5}} & \rho_{\sqrt{10}} & \rho_3 & \rho_{\sqrt{10}} & \rho_{\sqrt{17}} & \rho_4 & \rho_{\sqrt{17}} \\ & & 1 & \rho_{\sqrt{5}} & \rho_{\sqrt{2}} & \rho_1 & \rho_{2\sqrt{2}} & \rho_{\sqrt{5}} & \rho_2 & \rho_{\sqrt{13}} & \rho_{\sqrt{10}} & \rho_3 & \rho_{2\sqrt{5}} & \rho_{\sqrt{17}} & \rho_4 \\ & & & 1 & \rho_1 & \rho_2 & \rho_1 & \rho_{\sqrt{2}} & \rho_{\sqrt{5}} & \rho_2 & \rho_{\sqrt{5}} & \rho_{2\sqrt{2}} & \rho_3 & \rho_{\sqrt{10}} & \rho_{\sqrt{13}} \\ & & & & 1 & \rho_1 & \rho_{\sqrt{2}} & \rho_1 & \rho_{\sqrt{2}} & \rho_{\sqrt{5}} & \rho_2 & \rho_{\sqrt{5}} & \rho_{\sqrt{10}} & \rho_3 & \rho_{\sqrt{10}} \\ & & & & & 1 & \rho_{\sqrt{5}} & \rho_{\sqrt{2}} & \rho_1 & \rho_{2\sqrt{2}} & \rho_{\sqrt{5}} & \rho_2 & \rho_{\sqrt{13}} & \rho_{\sqrt{10}} & \rho_3 \\ & & & & & & 1 & \rho_1 & \rho_2 & \rho_1 & \rho_{\sqrt{2}} & \rho_{\sqrt{5}} & \rho_2 & \rho_{\sqrt{5}} & \rho_{2\sqrt{2}} \\ & & & & & & & 1 & \rho_1 & \rho_{\sqrt{2}} & \rho_1 & \rho_{\sqrt{2}} & \rho_{\sqrt{5}} & \rho_2 & \rho_{\sqrt{5}} \\ & & & & & & & & 1 & \rho_{\sqrt{5}} & \rho_{\sqrt{2}} & \rho_1 & \rho_{2\sqrt{2}} & \rho_{\sqrt{5}} & \rho_2 \\ & \text{Sym.} & & & & & & & & 1 & \rho_1 & \rho_2 & \rho_1 & \rho_{\sqrt{2}} & \rho_{\sqrt{5}} \\ & & & & & & & & & & 1 & \rho_1 & \rho_{\sqrt{2}} & \rho_1 & \rho_{\sqrt{2}} \\ & & & & & & & & & & & 1 & \rho_{\sqrt{5}} & \rho_{\sqrt{2}} & \rho_1 \\ & & & & & & & & & & & & 1 & \rho_1 & \rho_2 \\ & & & & & & & & & & & & & 1 & \rho_1 \\ & & & & & & & & & & & & & & 1 \end{bmatrix}$$

The correlation matrix is derived when i=1 and j=8 as follows:

$$R_{1,8} = \begin{bmatrix} 1 & \rho_1 & \rho_2 & \rho_1 & \rho_{\sqrt{2}} & \rho_{\sqrt{5}} & \rho_2 & \rho_{\sqrt{5}} & \rho_{2\sqrt{2}} & \rho_{\sqrt{13}} & \rho_{2\sqrt{5}} & \rho_{\sqrt{13}} & \rho_{3\sqrt{2}} & \rho_5 & \rho_{2\sqrt{5}} & \rho_5 & \rho_{4\sqrt{2}} \\ & 1 & \rho_1 & \rho_{\sqrt{2}} & \rho_1 & \rho_{\sqrt{2}} & \rho_{\sqrt{5}} & \rho_2 & \rho_{\sqrt{5}} & \rho_{2\sqrt{2}} & \rho_{\sqrt{13}} & \rho_{\sqrt{10}} & \rho_{\sqrt{13}} & \rho_{3\sqrt{2}} & \rho_{\sqrt{17}} & \rho_{2\sqrt{5}} & \rho_5 \\ & & 1 & \rho_{\sqrt{5}} & \rho_{\sqrt{2}} & \rho_1 & \rho_{2\sqrt{2}} & \rho_{\sqrt{5}} & \rho_2 & \rho_{\sqrt{5}} & \rho_{2\sqrt{2}} & \rho_3 & \rho_{\sqrt{10}} & \rho_{\sqrt{13}} & \rho_4 & \rho_{\sqrt{17}} & \rho_{2\sqrt{5}} \\ & & & 1 & \rho_1 & \rho_2 & \rho_1 & \rho_{\sqrt{2}} & \rho_{\sqrt{5}} & \rho_{\sqrt{10}} & \rho_{\sqrt{17}} & \rho_{2\sqrt{2}} & \rho_{\sqrt{13}} & \rho_{2\sqrt{5}} & \rho_{\sqrt{13}} & \rho_{3\sqrt{2}} & \rho_5 \\ & & & & 1 & \rho_1 & \rho_{\sqrt{2}} & \rho_1 & \rho_{\sqrt{2}} & \rho_{\sqrt{5}} & \rho_{\sqrt{10}} & \rho_{\sqrt{5}} & \rho_{2\sqrt{2}} & \rho_{\sqrt{13}} & \rho_{\sqrt{10}} & \rho_{\sqrt{13}} & \rho_{3\sqrt{2}} \\ & & & & & 1 & \rho_{\sqrt{5}} & \rho_{\sqrt{2}} & \rho_1 & \rho_{\sqrt{2}} & \rho_{\sqrt{5}} & \rho_2 & \rho_{\sqrt{5}} & \rho_{2\sqrt{2}} & \rho_3 & \rho_{\sqrt{10}} & \rho_{\sqrt{13}} \\ & & & & & & 1 & \rho_1 & \rho_2 & \rho_3 & \rho_4 & \rho_{\sqrt{5}} & \rho_{\sqrt{10}} & \rho_{\sqrt{17}} & \rho_{2\sqrt{2}} & \rho_{\sqrt{13}} & \rho_{2\sqrt{5}} \\ & & & & & & & 1 & \rho_1 & \rho_2 & \rho_3 & \rho_{\sqrt{2}} & \rho_{\sqrt{5}} & \rho_{\sqrt{10}} & \rho_{\sqrt{5}} & \rho_{2\sqrt{2}} & \rho_{\sqrt{13}} \\ & & & & & & & & 1 & \rho_1 & \rho_2 & \rho_1 & \rho_{\sqrt{2}} & \rho_{\sqrt{5}} & \rho_2 & \rho_{\sqrt{5}} & \rho_{2\sqrt{2}} \\ & & & & & & & & & 1 & \rho_1 & \rho_{\sqrt{2}} & \rho_1 & \rho_{\sqrt{2}} & \rho_{\sqrt{5}} & \rho_2 & \rho_{\sqrt{5}} \\ & & & \text{Sym.} & & & & & & & 1 & \rho_{\sqrt{5}} & \rho_{\sqrt{2}} & \rho_1 & \rho_{2\sqrt{2}} & \rho_{\sqrt{5}} & \rho_2 \\ & & & & & & & & & & & 1 & \rho_1 & \rho_2 & \rho_1 & \rho_{\sqrt{2}} & \rho_{\sqrt{5}} \\ & & & & & & & & & & & & 1 & \rho_1 & \rho_{\sqrt{2}} & \rho_1 & \rho_{\sqrt{2}} \\ & & & & & & & & & & & & & 1 & \rho_{\sqrt{5}} & \rho_{\sqrt{2}} & \rho_1 \\ & & & & & & & & & & & & & & 1 & \rho_1 & \rho_2 \\ & & & & & & & & & & & & & & & 1 & \rho_1 \\ & & & & & & & & & & & & & & & & 1 \end{bmatrix}$$

When pixel i=4 and j=5, the dispersion of the gradient vector can be derived as follows by substituting the above values.

$$D\left\{\begin{bmatrix} g_{c_4} \\ g_{r_4} \\ g_{c_5} \\ g_{r_5} \end{bmatrix}\right\} = \frac{\sigma_{n*s}^2}{16} \begin{bmatrix} P_1 & 0 & P_2 & 0 \\ 0 & P_1 & 0 & P_3 \\ P_2 & 0 & P_1 & 0 \\ 0 & P_3 & 0 & P_1 \end{bmatrix}$$

$P_1 = 12 + 16\rho_1 - 8\rho_2 - 16\rho_{\sqrt{5}} - 4\rho_{2\sqrt{2}},$ $P_2 = -6 - 8\rho_1 + 10\rho_2 + 16\rho_{\sqrt{5}} + 4\rho_{2\sqrt{2}}$
$\quad - 6\rho_4 - 8\rho_{\sqrt{17}} - 2\rho_{2\sqrt{5}},$ $P_3 = 2 + 8\rho_1 + 10\rho_2 + 8\rho_{\sqrt{5}} - 12\rho_{2\sqrt{2}}$
$\quad + 8\rho_3 - 8\rho_{\sqrt{13}} + 2\rho_4 - 2\rho_4 - 2\rho_{2\sqrt{5}}.$ When the pixel i=1, j=8, the dispersion of the gradient vector may be derived by substituting the above values as follows:

$$D\left\{\begin{bmatrix} g_{c_1} \\ g_{r_1} \\ g_{c_8} \\ g_{r_8} \end{bmatrix}\right\} = \frac{\sigma_{n*s}^2}{16} \begin{bmatrix} Q_1 & 0 & Q_2 & Q_3 \\ 0 & Q_1 & Q_3 & Q_2 \\ Q_2 & Q_3 & Q_1 & 0 \\ Q_3 & Q_2 & 0 & Q_1 \end{bmatrix}$$

$Q_1 = 12 + 16\rho_1 - 8\rho_2 - 16\rho_{\sqrt{5}} - 4\rho_{2\sqrt{2}},$ $Q_2 = -1 - 4\rho_1 - 4\rho_2 + 8\rho_{\sqrt{5}} + 12\rho_{2\sqrt{2}} + 4\rho_3$
$\quad + 8\rho_{\sqrt{13}} - 2\rho_4 - 4\rho_{\sqrt{13}} - 4\rho_{2\sqrt{5}} - 4\rho_5$
$\quad - \rho_{4\sqrt{2}},$ $Q_3 = -1 - 4\rho_1 - 4\rho_2 + 4\rho_3 - 8\rho_{\sqrt{10}} + 2\rho_4$
$\quad + 4\rho_{\sqrt{17}} - 4\rho_{3\sqrt{2}} + 4\rho_5 - \rho_{4\sqrt{2}}.$ That is, the dispersion of the single angle difference when i=4 and j=5 is derived as follows:

$$\sigma_{\theta_4-\theta_5}^2 = D\{\theta_4 - \theta_5\}$$

$$= \frac{\sigma_n^2}{64\pi\sigma_s^2}\left[\frac{P_1}{g_{c_4}^2 + g_{r_4}^2} + \frac{P_1}{g_{c_5}^2 + g_{r_5}^2}\right.$$

$$\left. - 2 \cdot \frac{g_{r_4}g_{r_5}P_2 + g_{c_4}g_{c_5}P_3}{(g_{c_4}^2 + g_{r_4}^2)(g_{c_5}^2 + g_{r_5}^2)}\right].$$

The dispersion of the single angle difference when i=1 and j=8 is derived as follows:

$$\sigma_{\theta_1-\theta_8}^2 = D\{\theta_1 - \theta_8\}$$

$$= \frac{\sigma_n^2}{64\pi\sigma_s^2}\left[\frac{Q_1}{g_{c_1}^2 + g_{r_1}^2} + \frac{Q_1}{g_{c_8}^2 + g_{r_8}^2}\right.$$

$$\left. - 2Q_2 \cdot \frac{g_{r_1}g_{r_8} + g_{c_4}g_{c_5}}{(g_{c_1}^2 + g_{r_1}^2)(g_{c_8}^2 + g_{r_8}^2)}\right.$$

$$\left. + 2Q_3 \cdot \frac{g_{r_1}g_{c_8} + g_{c_1}g_{r_8}}{(g_{c_1}^2 + g_{r_1}^2)(g_{c_8}^2 + g_{r_8}^2)}\right].$$

Hereinafter, the SNR value is obtained through the obtained value, and the performance is compared with the conventional SD-based line detection method.

For simplicity of the comparison of performance of the line detection method according to the present invention with the SD-based line detection, a line aligned along the vertical direction with width "w" is employed.

Then, the line is assumed to have the following gradient values at pixels "i" and "j" that are located one pixel the left and right, respectively, from the center of the line.

$g_{c_i} = g$ $g_{r_i} = 0$ $g_{c_j} = -g$ $g_{r_j} = 0,$ $g = F'_{b*s}|_{x=L-1}$

Then, at the center of the line, the standard deviation of the gradient angle difference in the column direction is derived as follows:

$$\sigma_{\theta_4-\theta_5} = \frac{\sigma_n\sqrt{P_1+P_3}}{4\sqrt{2\pi}\,\sigma_s g}.$$

Thereafter, at the center of the line, the standard deviation of the gradient angle difference in the lower-right diagonal direction, is derived as follows:

$$\sigma_{\theta_1-\theta_8} = \frac{\sigma_n\sqrt{Q_1+Q_2}}{4\sqrt{2\pi}\,\sigma_s g}.$$

For the line model assumed in the first paragraph of the present invention, the strength of the line signal based on the angle difference is $\pi$. Therefore, the SNR of the angular difference in the horizontal direction is derived as follows:

$$SNR_{\theta_4-\theta_5} = \frac{\pi}{\sigma_{\theta_4-\theta_5}} = \frac{4\pi\sqrt{2\pi}\,\sigma_s}{\sigma_n\sqrt{P_1+P_3}}g.$$

Moreover, the SNR of the angle difference in the lower-right diagonal direction is derived as follows:

$$SNR_{\theta_1-\theta_8} = \frac{\pi}{\sigma_{\theta_1-\theta_8}} = \frac{4\pi\sqrt{2K}\,\sigma_s}{\sigma_n\sqrt{Q_1+Q_2}}g.$$

For the line detection method according to the present invention, the performance is measured based on combination of both the gradient angle difference and SNR of the first derivative.

Thus, the SNR combined for the line detection using the gradients at the fourth and fifth pixels in FIG. 12 is modeled as follows:

$$SNRC(\text{line}_{\theta_4-\theta_5})=\sqrt{SNR(\text{line}_{D_c})\cdot SNR_{\theta_4-\theta_5}}$$

Additionally, the SNR combined for the line detection using the gradients at the first and eighth pixels in FIG. 12 is modeled as follows:

$$SNRC(\text{line}_{\theta_1-\theta_8})=\sqrt{SNR(\text{line}_{D_c})\cdot SNR_{\theta_1-\theta_8}}$$

In addition, when a penalty function is applied to the above equations, they can be expressed as follows:

$$SNRPS(\text{line}_{\theta_4-\theta_5})=p(\sigma b,\sigma s)\cdot SNRC(\text{line}_{\theta_4-\theta_5})$$

$$SNRPS(\text{line}_{\theta_1-\theta_8})=p(\sigma b,\sigma s)\cdot SNRC(\text{line}_{\theta_1-\theta_8})$$

Then, the SNR value resulting from application of the penalty function to the sum of the gradient angle differences for all of the four pairs in FIG. 12 can be modeled as follows:

$$SNRPS(\text{line}_{SGAD})=SNRPS(\text{line}_{\theta_1-\theta_8})+SNRPS(\text{line}_{\theta_2-\theta_7})+SNRPS(\text{line}_{\theta_3-\theta_6})+SNRPS(\text{line}_{\theta_4-\theta_5})$$

Because of the symmetry between the pair of gradients at pixel 1 and pixel 8 and the pair of gradients at pixel 3 and pixel 6 in FIG. 12, $SNRPS(\text{line}_{\theta_3-\theta_6})=SNRPS(\text{line}_{\theta_1-\theta_8})$ is established, and since the gradients at pixel 2 and pixel 7 are zero for the assumed line model, $SNRPS(\text{line}_{\theta_2-\theta_7})=0$ is established.

Therefore, the SNR value in the detection method for finally detecting the assumed line model is derived as follows:

$$SNRPS(\text{line}_{SGAD})=SNRPS(\text{line}_{\theta_4-\theta_5})+2\cdot SNRPS(\text{line}_{\theta_1-\theta_8})$$

To investigate the performance of SGAD-based line detection, a graphical plot of SNR is used as follows. The following SNR values are applied with a noise factor of 0.1 and a blurring factor of 1.0.

Figure 14:
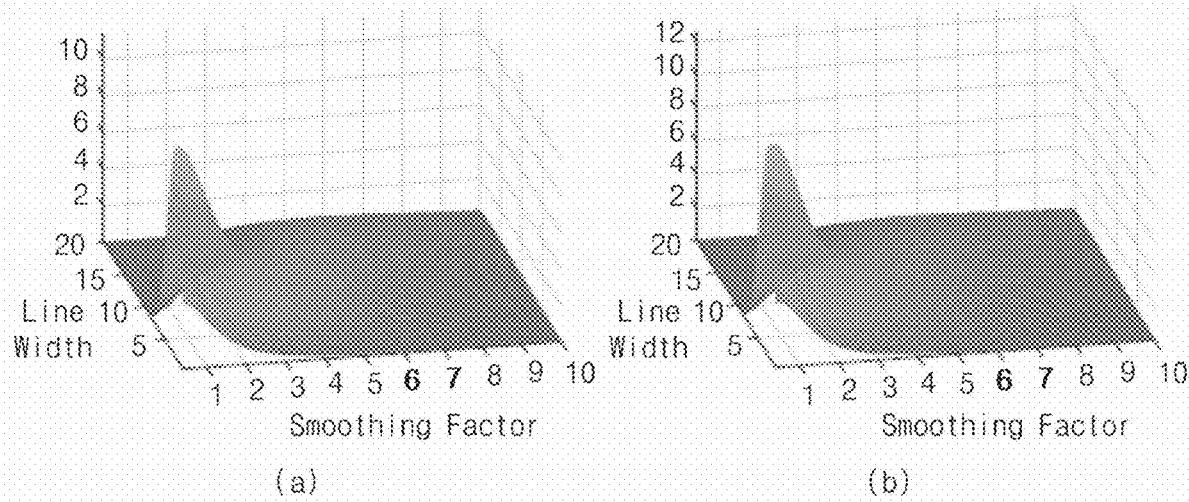
FIGS. 14(a) to 14(b) illustrate SNRPS for a pair of gradient angles according to FIG. 13.

FIGS. 14(a) to 14(b) are diagrams illustrating SNRPS of a pair of gradient angles according to FIG. 13. According to this, it can be seen that the SNR of a pair of gradient angle differences has a high value in a state where the smoothing factor is low and the line width is up to about 8.

Figure 15:
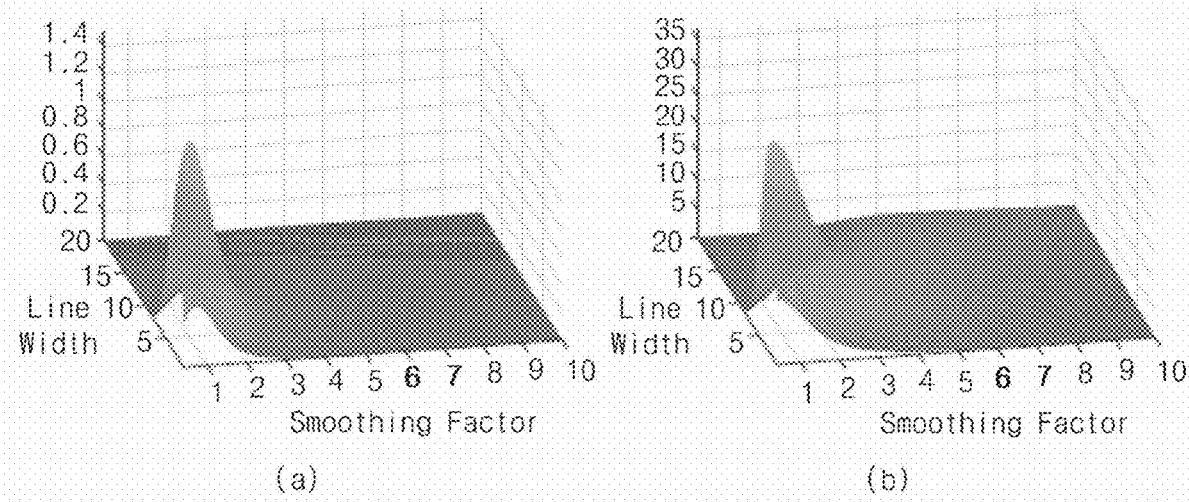
FIGS. 15(a) to 15(b) illustrate SNRPS of derivative values for a pair of gradient angles according to FIG. 13.

FIGS. 15(a) to 15(b) are diagrams illustrating SNRPS of derivative values of a pair of gradient angles according to FIG. 13. Referring to FIG. 15(a), the value between pixels 1 and 8 is slightly higher than the value between pixels 4 and 5, because the gradient correlation between 1 and 8 is lower than the gradient correlation between 4 and 5.

Figure 16:
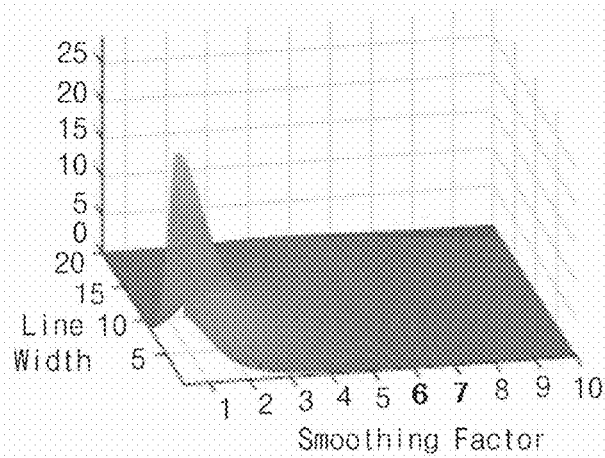
FIGS. 16(a) to 16(b) and FIGS. 17(a) to 17(b) are diagrams comparing a line detection method according to the present invention, an existing edge detection method, and an SD-based line detection method.
Figure 16:
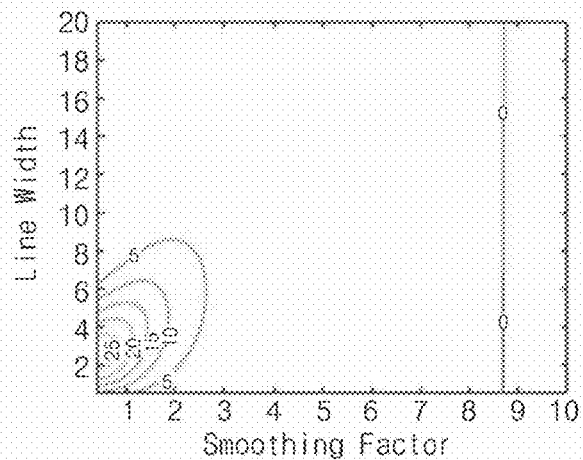

The difference shown in FIG. 16 represents a difference in SNRPS values between the line detection method according to the present invention and the SD-based line detection method. According to FIG. 16, the SGAD-based line detection has a higher SNR value than the SD-based line detection under various smoothing factors and line conditions. When the smoothing factor of 1.0 is applied, the advantage of the SGAD-based line detection becomes distinct for a line width less than 8 pixels.

Figure 17:
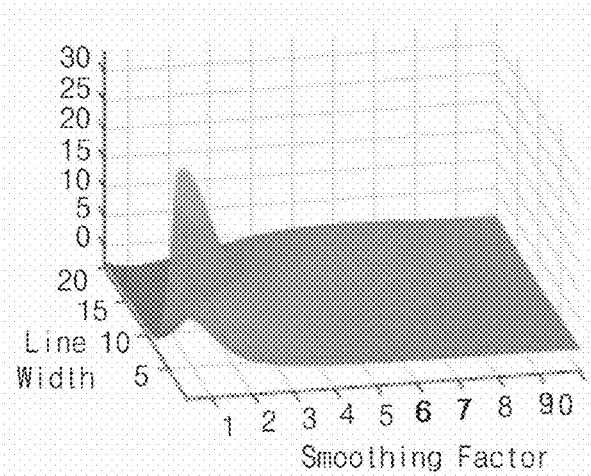
Figure 17:
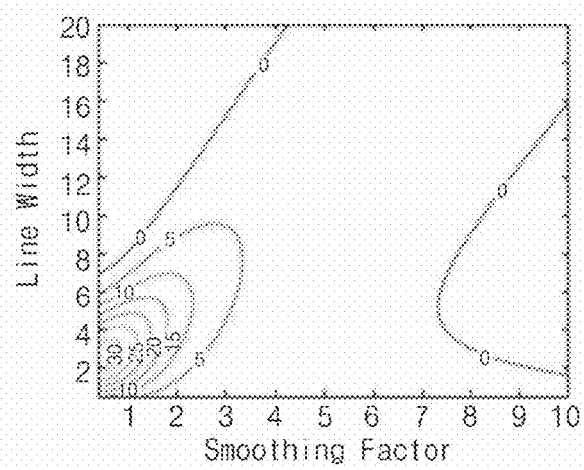

FIG. 17 shows the difference in SNRPS values of the line detection method according to the present invention and the indirect line detection method using edge detection. According to FIG. 17, the SGAD-based line detection is shown to detect a line more effectively when the line is not relatively wide.

In the above, it has been demonstrated that the line detection method according to the present invention can effectively detect a line compared to the conventional method. Hereinafter, a process of determining an actual line by using the sum of the gradient angle differences as described above will be described.

The next step for implementing line detection based on the sum of the gradient angle differences in the present invention is to find threshold values of the range that can be determined as a line using the minimum value of the gradient angle difference for pixels such that pixels are classified as a line pixel. The standard deviation of the gradient angle differences is investigated under various angle combinations to find the optimal threshold value that can be applied to line pixels with various combinations of gradient angles.

Figure 18:
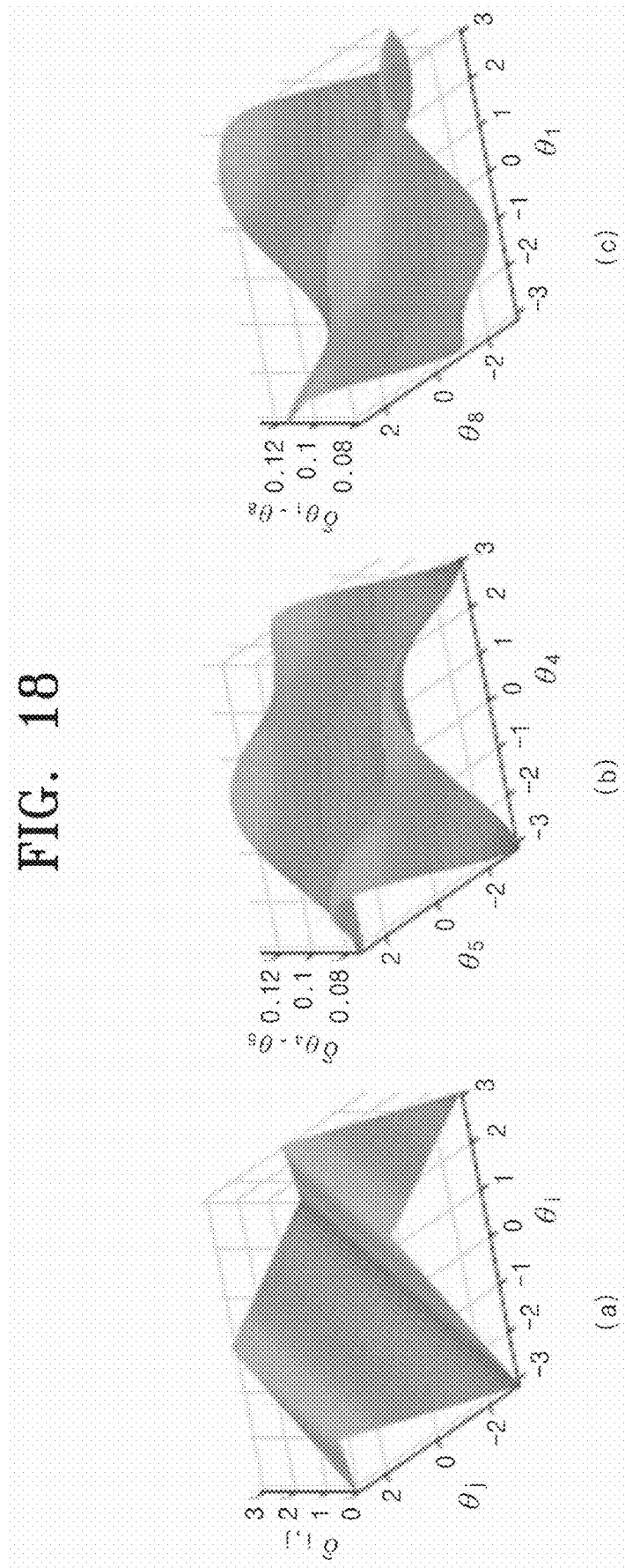
FIGS. 18(a) to 18(c) illustrates gradient angle differences and standard deviations thereof.

FIG. 18(a) shows all possible values of the gradient angle difference for a combination of varying gradient angles. For a combination of gradient angles, the standard deviation of the gradient angle differences is investigated for a case where the smoothing factor is 0.4 to 10 with an interval of 0.1, and "w" is 0.5 to 20 with an interval of 0.1. FIG. 18 (b) and (c) are tested under the conditions of a noise coefficient of 0.5, a blurring factor of 1.0, a smoothing factor of 1.0, and a width of 4.0.

An optimal threshold value is searched for each of combinations of smoothing factors and line widths "w". For each combination, the search starts with the value of $\pi$ for the value of a threshold and ends with the value of 0.0. In this process, the signal strengths that are calculated by the gradient angle differences and the noise strengths that are calculated by the standard deviation of the gradient angle differences are accumulated for threshold values from π to a certain value. Then, for a specific combination of smoothing factors and line widths "w", the optimal threshold value is determined by finding the peak of the difference between the accumulated signal strengths and the accumulated noise strengths.

Figure 19:
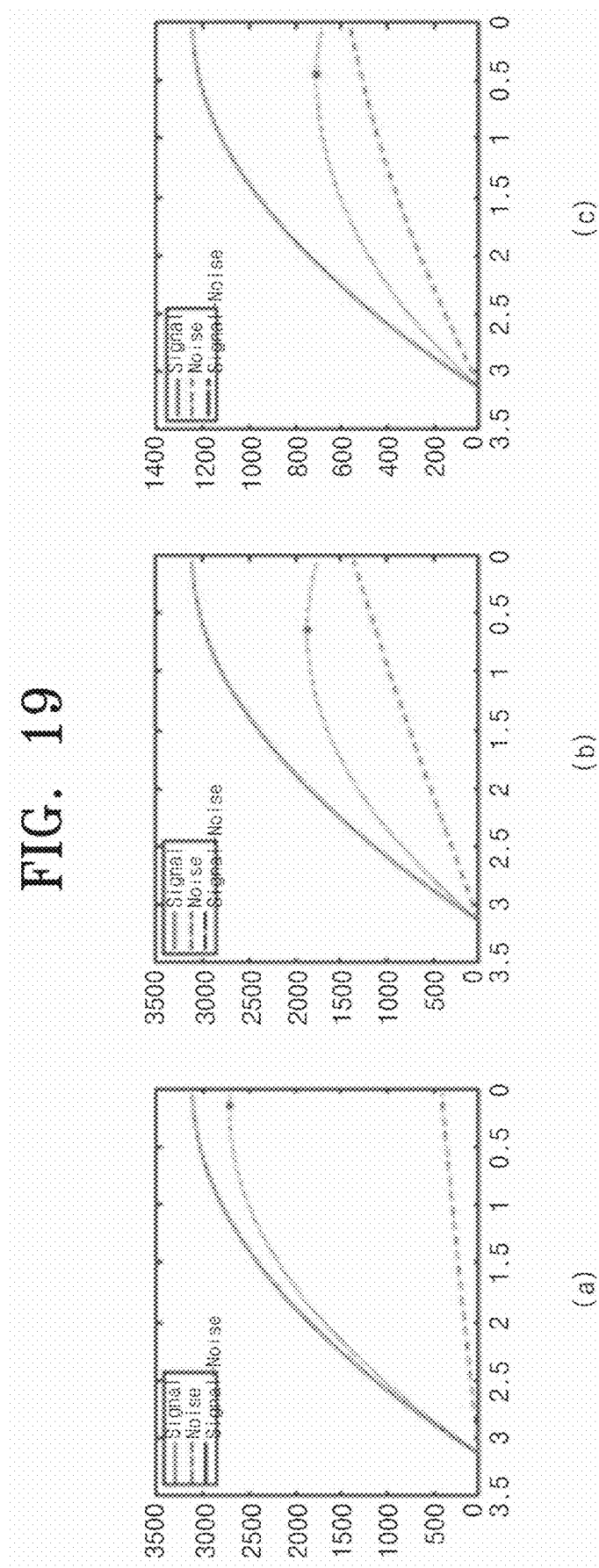
FIGS. 19(a) to 19(c) illustrate finding an optimal threshold.
Figure 20:
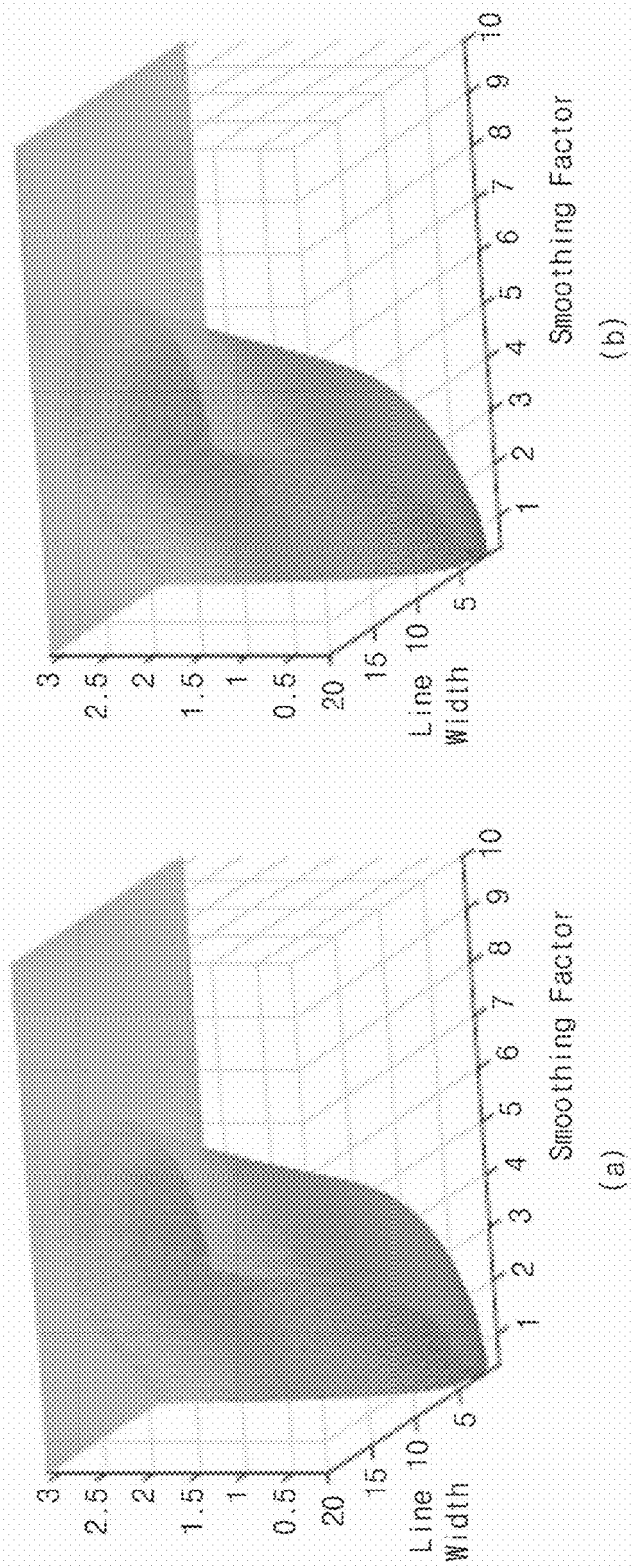
FIGS. 20(a) to 20(b) shows results according to FIG. 19.

FIG. 19 shows several cases of combinations of smoothing factors and "w". Referring to FIG. 19, the optimal threshold value is a value capable of varying according to changes in the smoothing factor and "w". The change in the optimal threshold value for various combinations of smoothing factors and "w" is caused by difference in the angles in the column direction and the diagonal direction, respectively. As shown in the results in FIGS. 19 and 20, the optimal threshold values for two angle distributions may appear very similar to each other.

The optimal threshold value of the sum of the gradient angle differences is finally calculated by adding the mean of the optimal threshold values for $\theta_4$–$\theta_5$ and two times the mean of the optimal threshold value for $\theta_1$–$\theta_8$ at all the combinations of smoothing factors and "w" except whose addition generates 3π because those combinations can make line detection non-plausible. According to an example, when k=1, the blurring factor is 1.0, and the noise factor is 0.05, the optimal threshold value of SGAD is 3.6766 (rad).

That is, for the threshold value of the sum of the gradient angle differences according to the present invention, the optimal value may be 3.6766, which is a value slightly larger than π. However, the maximum possible sum of the gradient angle differences corresponds to 3π, and when the range of the sum of the gradient angle differences is π to 3π, it is possible to detect as a line candidate.

As the final step of the line detection method according to the present invention, a method of selecting a pixel that can be actually determined as a line from among pixels detected as candidates for a line will be described below.

A pixel classified as a candidate in which a line is located can be classified as a ridge or a valley.

A ridge means a pixel having an intensity greater than that of a neighborhood pixel, and a valley means a pixel having an intensity less than that of a neighborhood pixel. The step of classifying pixels into ridges or valleys may be calculated based on gradients and the sum of convolutions of two kernels.

The first kernel and the second kernel may be defined as follows:

$$N_c = \begin{bmatrix} -1 & 0 & 1 \\ -1 & 0 & 1 \\ -1 & 0 & 1 \end{bmatrix}, N_r = \begin{bmatrix} -1 & -1 & -1 \\ 0 & 0 & 0 \\ 1 & 1 & 1 \end{bmatrix}$$

That is, an equation for determining whether a line pixel at an arbitrary location (r,c) is a ridge or a valley is derived as follows:

$$RV(r,c) = -[(g_r * N_r) + (g_c * N_c)](r,c)$$

where $g_r$ and $g_c$ represent images containing gradients in a row direction and a column direction, respectively. When RV(r, c) at the corresponding line pixel is positive, it is classified as a ridge, and when RV(r, c) at the corresponding line pixel is negative, it is classified as a valley.

When the classification of pixels determined as line candidates as described above is finished, a non-maxima suppression process is performed to eliminate the detected line pixels whose absolute values of the sum of gradient angle differences are non-maxima as compared to those of their neighborhood pixels.

That is, the suppression process is performed only on neighborhood pixels having the same line class among pixels for the center line. In addition, the suppression process employs the maximum curvature direction, which is determined from the eigen-vector corresponding to the maximum eigen-value of the Hessian matrix When the sum of the gradient angle differences of neighborhood pixels within 45 degrees from the maximum curvature direction is greater than the sum of the gradient angle differences of the central pixel, the center pixel is suppressed. That is, it is eliminated from the candidates of the detected lines.

As described above, by performing the suppression process only on pixels having the same line class to determine whether a pixel is a line candidate, it is possible to effectively perform detection of lines having the same tendency.

Figure 21:
FIGS. 21(a) to 21(d) are original images to be tested.
Figure 21:
Figure 21:
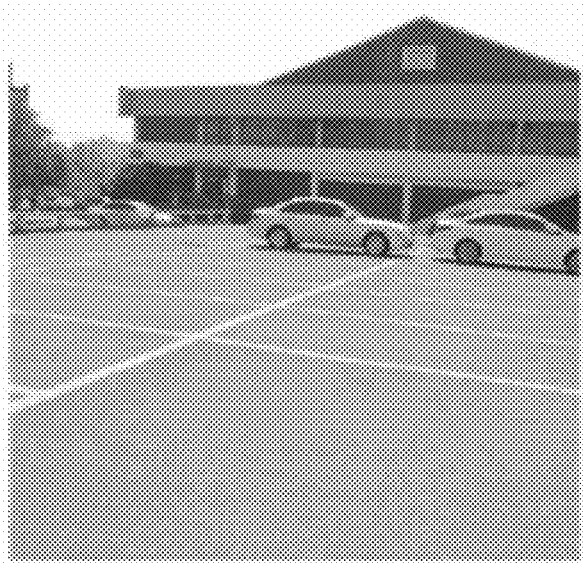
Figure 21:
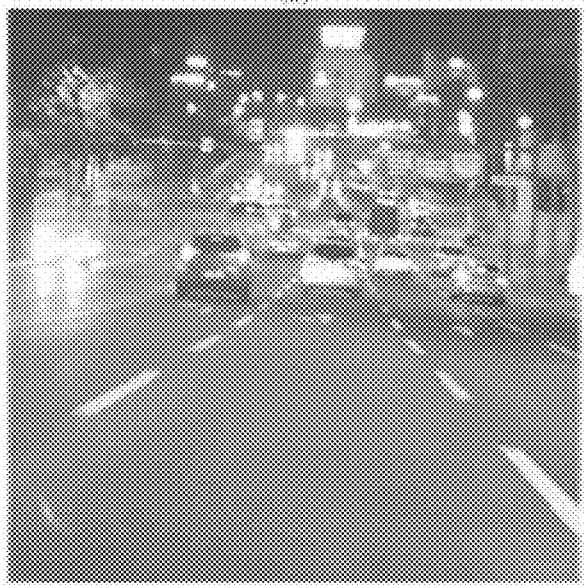

FIG. 21 illustrates original images to be tested.

According to the present invention, whether a pixel is a ridge or a valley may be determined, and pixels having the same features may be determined as the same line.

Figure 22:
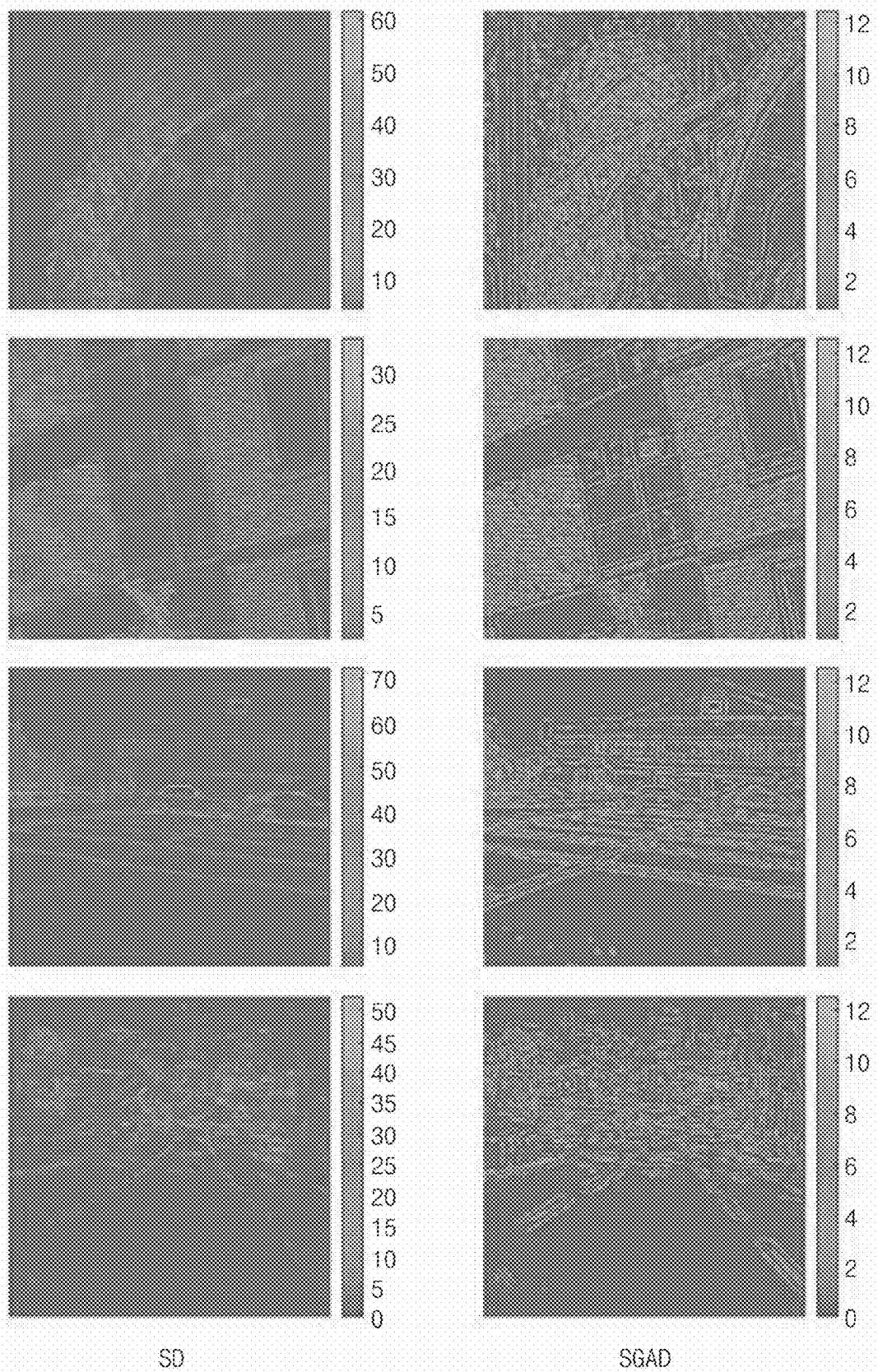
FIG. 22 illustrates a result of SD-based line detection and a result of the line detection method according to the present invention, respectively, for results line detection for an original image.

FIG. 22 is a diagram illustrating a result of SD-based line detection and a result of the line detection method according to the present invention, respectively, for results line detection for an original image.

According to FIG. 22, the first column shows the original image, the second column shows results of SD-based line detection, and the third column shows results of line detection according to the present invention.

That is, it can be seen that the result according to the present invention is clear, compared to the results of the existing second derivative-based method and the line can be detected more clearly even when the line width is wide.

The present invention has the effect that it can be used universally in the field related to image processing. The present invention can be utilized in industrial fields using image processing or computer vision.

The line detection method according to an embodiment of the present invention may be performed by a device including at least one processor and a memory. The steps constituting the line detection method may be executed by a processor. A program for executing each step of the edge locationing method may be stored in the memory. The processor may include a central processing unit (CPU), a graphic processing unit (GPU), a general purpose graphic processing unit (GPGPU), and the like.

The above embodiments are presented to help the understanding of the present invention, and do not limit the scope of the present invention, and it should be understood that various modified embodiments therefrom also fall within the scope of the present invention. The technical protection scope of the present invention should be determined by the technical spirit of the claims, and it should be understood that the technical protection scope of the present invention is not limited to the literal description of the claims itself, but is substantially equivalent to the technical value.

The invention claimed is:

1. A method for detecting a line from an image or a video, comprising:
   smoothing an image;
   selecting an area in which a line is to be detected;
   determining a center pixel in the selected area;
   applying a window centered on the center pixel;
   detecting a sum of gradient angle differences of pixels surrounding the center pixel;

detecting a sum of gradient angle differences of pixels facing each other with respect to the center pixel; and determining a portion included in the area as a line candidate when a result value of the detected sum is greater than or equal to a specific value, wherein the specific value is $\pi$ to $3\pi$.

2. The method of claim 1, wherein the window is a 3×3 window.

3. The method of claim 1, wherein the method further includes classifying the center pixel determined as the line candidate into a ridge or a valley; and eliminating a non-maximum pixel.

4. The method of claim 3, further comprising:

selecting a line for pixels corresponding to same line class.

5. The method of claim 4, wherein the eliminating of the non-maximum pixel includes calculating a sum of gradient angle differences for neighborhood pixels whose classification of the center pixel correspond to the same line class.

6. The method of claim 5, wherein the eliminating of the non-maximum pixel includes comparing the sum of the gradient angle differences of the neighborhood pixels with the sum of the gradient angle differences of the center pixel.

7. The method of claim 6, further comprising:

selecting the center pixel as a line when the sum of the gradient angle differences of the center pixel is greater than the sum of the gradient angle differences of the neighborhood pixels.

8. A non-transitory computer-readable storing medium for storing a program for causing a computer to execute a method line detection, the method comprising:

smoothing an image;

selecting an area in which a line is to be detected;

determining a center pixel in the selected area;

applying a window centered on the center pixel;

detecting a sum of gradient angle differences of pixels surrounding the center pixel;

detecting a sum of gradient angle differences of pixels facing each other with respect to the center pixel; and determining a portion included in the area as a line candidate when a result value of the detected sum is greater than or equal to a specific value, wherein the specific value is $\pi$ to $3\pi$.

9. The non-transitory computer-readable storing medium of claim 8, wherein the method further includes:

classifying the center pixel determined as a line candidate into a ridge or a valley; and eliminating a non-maximum pixel.

10. The non-transitory computer-readable storing medium of claim 9, further comprising:

selecting a line for pixels corresponding to same line class.

11. The non-transitory computer-readable storing medium of claim 10, wherein the eliminating of the non-maximum pixel includes calculating a sum of gradient angle differences for neighborhood pixels whose classification of the center pixel correspond to the same line class.

12. The non-transitory computer-readable storing medium of claim 11, wherein the eliminating of the non-maximum pixel includes comparing the sum of the gradient angle differences of the neighborhood pixels with the sum of the gradient angle differences of the center pixel.

13. The non-transitory computer-readable storing medium of claim 12, further comprising:

selecting the center pixel as a line when the sum of the gradient angle differences of the center pixel is greater than the sum of the gradient angle differences of the neighborhood pixels.

* * * * *